United States Patent
Chaumat et al.

(10) Patent No.: US 8,763,883 B2
(45) Date of Patent: Jul. 1, 2014

(54) METHOD FOR ASSEMBLING PARTS MADE OF SIC MATERIALS BY NON-REACTIVE BRAZING, BRAZING COMPOSITIONS, AND JOINT AND ASSEMBLY OBTAINED BY SAID METHOD

(75) Inventors: Valérie Chaumat, Saint-Paul-de-Varces (FR); Jean-François Henne, Bethune (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 281 days.

(21) Appl. No.: 13/394,925

(22) PCT Filed: Sep. 3, 2010

(86) PCT No.: PCT/EP2010/062995
§ 371 (c)(1),
(2), (4) Date: Jul. 25, 2012

(87) PCT Pub. No.: WO2011/029785
PCT Pub. Date: Mar. 17, 2011

(65) Prior Publication Data
US 2012/0308839 A1 Dec. 6, 2012

(30) Foreign Application Priority Data
Sep. 8, 2009 (FR) ..................... 09 56116

(51) Int. Cl.
*B23K 31/02* (2006.01)
*B23K 1/19* (2006.01)
*B23K 20/16* (2006.01)
*B32B 9/06* (2006.01)
*B32B 15/04* (2006.01)
*B32B 9/00* (2006.01)
*B32B 19/00* (2006.01)

(52) U.S. Cl.
USPC ..... 228/121; 228/262.9; 420/578; 219/85.13; 428/450; 428/457; 428/697; 428/698; 428/699

(58) Field of Classification Search
USPC ............. 219/85.13; 228/121, 262.9; 420/578; 428/450, 457, 697, 698, 699
See application file for complete search history.

(56) References Cited

U.S. PATENT DOCUMENTS

| | | | |
|---|---|---|---|
| 3,813,759 A | 6/1974 | Heap et al. | |
| 5,447,683 A | 9/1995 | Montgomery et al. | |

(Continued)

FOREIGN PATENT DOCUMENTS

| | | |
|---|---|---|
| EP | 2165794 A1 | 3/2010 |
| JP | 8052590 A | 2/1996 |

OTHER PUBLICATIONS

International Search Report for International application No. PCT/EP2010/062995 dated Nov. 18, 2010 by European Patent Office.

(Continued)

*Primary Examiner* — Jonathan Langman
(74) *Attorney, Agent, or Firm* — Knobbe Martens Olson & Bear LLP

(57) ABSTRACT

A method for assembling at least two parts made of silicon carbide-based materials by non-reactive brazing is disclosed. The two parts are contacted with a non-reactive brazing composition. The assembly formed by the parts and the brazing composition is heated to a brazing temperature sufficient to melt the brazing composition. The parts and the brazing composition are cooled so that, after solidification of the brazing composition, a moderately refractory joint is formed. The non-reactive brazing composition is a binary alloy composed, in mass percentages, of about 46% to 99% silicon and 54% to 1% neodymium.

28 Claims, 3 Drawing Sheets

(56) References Cited

U.S. PATENT DOCUMENTS

| | | | |
|---|---|---|---|
| 5,975,407 | A | 11/1999 | Gasse et al. |
| 6,835,496 | B1 | 12/2004 | Kaminaka et al. |
| 7,318,547 | B2 | 1/2008 | Gasse |
| 2003/0038166 | A1 | 2/2003 | Gasse |
| 2005/0079343 | A1* | 4/2005 | Raybould et al. ............ 428/336 |
| 2006/0162849 | A1 | 7/2006 | Han |
| 2006/0280952 | A1* | 12/2006 | Hazel et al. ................. 428/446 |
| 2008/0223489 | A1 | 9/2008 | Nagata et al. |
| 2010/0075160 | A1 | 3/2010 | Chaumat et al. |
| 2010/0159252 | A1* | 6/2010 | Kirby et al. .................. 428/446 |

OTHER PUBLICATIONS

French Search Report for French Patent Application No. FR0956116 dated Apr. 29, 2010.

A.B. Gokhale et al., "Binary Alloy Phase Diagrams" Second edition, vol. 3, Nd—Si (Neodymium-Silicon), XP009152735, The Matirials internation Socieltly, 1990.

International Preliminary Report on Patentability for International Application No. PCT/EP2010/062995 dated Sep. 8, 2009 by European Patent Office.

* cited by examiner

METHOD FOR ASSEMBLING PARTS MADE OF SIC MATERIALS BY NON-REACTIVE BRAZING, BRAZING COMPOSITIONS, AND JOINT AND ASSEMBLY OBTAINED BY SAID METHOD

RELATED APPLICATIONS

This application is a U.S. National Phase of International Application No. PCT/EP2010/062995, filed Sep. 3, 2010, which is incorporated by reference in its entirety.

BACKGROUND

1. Technical Field

The present invention relates to a method for assembling parts made of silicon carbide-based materials by non-reactive brazing, using a non-reactive brazing composition, in order especially to prepare components entirely fully based on silicon carbide.

The assembly method according to the invention is generally implemented at a temperature not exceeding 1450° C., preferably at between 1210° C. and 1450° C.

The invention additionally relates to brazing compositions and to the joint and to the moderately refractory assembly obtained with this method.

In general, by <<moderately refractory>> is meant a maximum temperature of use of the assembled component of generally between 1000° C. and 1100° C.

By "silicon carbide-based" materials is generally meant a material having a SiC content equal to or more than 50% by weight, preferably equal to or more than 80% by weight, further preferably 100% by weight, in this latter case it can be said that the material is constituted or composed of silicon carbide.

The silicon carbide may be in the form of fibers of silicon carbide or of a silicon carbide powder that is sintered, or bound by a ceramic binder.

These silicon carbide-based materials may in particular be pure silicon carbide such as pure α silicon carbide (α-SiC) or β silicon carbide (β-SiC), or substrates made of silicon-infiltrated silicon carbide (SiSiC), or SiC-based composite materials such as composite materials with silicon carbide fibers and/or matrix.

The technical field of the invention may be defined as brazing at an implementing temperature (temperature equivalent to the brazing plateau temperature) generally not exceeding 1450° C., preferably at a temperature from 1210° C. to 1450° C.

The assemblies concerned by the present invention are therefore generally considered to be <<moderately refractory>> i.e. the maximum temperature of use of these assemblies is generally of the order of 1000° C. to 1100° C.

These assemblies may enter into the manufacture of components of complex shapes requiring very good mechanical strength between the silicon carbide-based substrates, and optionally a satisfactory seal either side of the joint.

2. Description Of The Related Technology

It is known that it is difficult to manufacture parts of large size made of ceramic, made of SiC in particular. The tolerances after sintering the primary components made of silicon carbide of large size are effectively poorly controlled, and the machining of these components is unacceptable for cost-related reasons.

In addition, and for the same reasons, it is generally difficult to manufacture parts of complex shape with silicon-based compounds such as silicon carbide.

It is therefore often preferable to manufacture parts or structures of large size and/or of complex shape from elements made of ceramics of simple shape and/or small size, then to assemble these elements to form the final structure.

Said technique is particularly necessary for, manufacturing structures of heat exchanger type, and components of structures made of silicon carbide having a temperature of use of up to 1000° C. for example, even up to 1100° C.

On account of the high temperatures, in the region of 1000° C. for example, used in applications of ceramics such as silicon carbide, the assembling of these ceramics by bonding with organic adhesives is excluded since the temperatures of use of this type of assembly cannot exceed 200° C. at the most.

Purely mechanical assemblies, e.g. by stappling or screwing, only ensure partial random contact between the parts. The assemblies thus obtained cannot be seal tight. Mechanical strength is only ensured by the staples and screws, which is limited. To ensure good mechanical strength of the joint, it is essential to create good adhesion between the parts to be assembled, which is not possible with screws or staples.

In addition, conventional assembly techniques by welding using an energy beam with or without a supply of metal (TIG, electron beam or laser beam welding) and involving partial fusion of the parts to be assembled cannot be used for the assembly of ceramics, since it is not possible to melt a substrate or part made of ceramic and, in particular, since silicon carbide decomposes before fusion.

Common techniques for producing refractory assemblies of ceramics are solid phase diffusion welding and assembly by sintering or co-sintering.

For assembling by diffusion welding, pressure at high temperature is applied to the interfaces to allow atom inter-diffusion between the two substrates. The temperature must always remain lower than the melting point of the least refractory material, and there is therefore no liquid phase in the system. This type of assembly is formed either under a press in a single direction, or in an isostatic chamber. Diffusion welding is well adapted to assemblies between two metal alloys and very little to the assembly of ceramic materials since the constituent atoms of ceramic scarcely diffuse at the joint. Also, the process is prohibitive from a mechanical viewpoint, since it requires placing under compression porous and fragile substrates and materials such as silicon carbide-based substrates which may be highly damaged by this mechanical compressive loading.

The assembly of SiC parts by sintering or co-sintering also requires high pressures, but in additional high temperatures and long temperature plateaus since this process is based on the principle of inter-diffusion between the SiC elements.

In other words, welding by solid phase diffusion and assembly by sintering have the disadvantage of being restrictive with respect to their implementation since:

for solid phase diffusion welding, the shape of the parts must remain simple if uniaxial pressing is used, otherwise it may require complex tooling and preparation comprising for example the fabrication of an envelope, leak tight vacuum closure, Hot Isostatic Pressing, final machining of the envelope, if Hot Isostatic Pressing HIP is used.

for assembly by sintering or co-sintering, the same problems remain (shape of the parts, complex implementation) with, in addition, the need to control the sintering of an added powder to be intercalated between the two materials to be assembled.

these two techniques further require the use of long temperature plateaus (one to several hours) at high temperature, since the processes involved entail solid state diffusion.

It follows from the foregoing, and to summarize, that in order to guarantee in particular good mechanical strength and optionally satisfactory sealing, leaktightness of the assembly, only processes using a liquid phase such as brazing can be contemplated.

Brazing is a low-cost technique, easy to conduct, and is the most commonly used. Parts of complex shapes can be made by brazing and the brazing operations are restricted to placing, between the parts to be assembled or close to the joint between the two parts, a brazing alloy called a braze, or an added alloy, this alloy being capable of wetting and spreading over the interfaces to be assembled in order to fill the joint between the parts and to melt this alloy. After cooling, the brazing alloy, braze solidifies and ensures the cohesion of the assembly.

Most braze compositions for parts in silicon-carbide based materials are not sufficiently refractory. These are generally brazing compositions formed of metal alloys having a melting point lower than, even much lower than 1000° C. Said melt temperature is markedly insufficient for applications at temperatures in the region of 1000° C. or 1100° C.

In addition, most of the chemical elements which belong to these metal brazing compositions are highly reactive with silicon carbide on and after 500° C., and they form fragile compounds.

As a result, for brazing at higher temperatures generally performed at above 1000° C., said brazing compositions or braze alloys would chemically attack the silicon carbide-based materials, not only during the brazing operation but also when functioning by solid state diffusion.

It is also pointed out that the least reactive alloys are also the least refractory, such as the AgCuTi alloy for example with Ag-Cu matrix and active Ti element in low concentration. For the applications that are more particularly targeted by the present invention, which are applications of moderately refractory assemblies the temperatures of use of the assemblies possibly reaching up to 1000° C., even 1100° C. in general, all the reactive braze compositions that are chiefly formed of silver or silver-copper, copper, nickel, iron or cobalt, platinum, palladium or gold must therefore be excluded on account of their strong reactivity with silicon carbide.

Formulations of braze alloys, braze compositions that are more refractory and with high silicon content are presented in documents [1, 2, 3]. These braze compositions have scarcely reactive, even non-reactive, behaviour with SiC, which prevents the formation of fragile compounds. This criterion of non-reactivity or scarce reactivity is not a sufficient condition however to guarantee good mechanical strength of the brazed joints. In the literature, the ultimate load values vary greatly in relation to the second element contained in the silicon-based braze composition. For example, for the non-reactive Fe—Si system (45% Fe-55% Si by weight), document [3] mentions an extremely low ultimate tensile strength of the order of 2 MPa whilst for the Cr—Si system (25% Cr-75% Si by weight), this same document gives a higher value of the order of 12 MPa.

The properties, in particular the mechanical properties, of a silicon-based braze composition are fully unpredictable, and absolutely cannot be inferred from the mechanical properties of even very similar Si-based braze compositions that are already known.

In other words, when it is sought to prepare a silicon-based braze composition, in particular for brazing SiC-based parts, it is absolutely not possible to rely on the possibly acceptable mechanical properties displayed by other known Si-based braze compositions, since any modification even very small of a Si-based braze composition, both regarding the type of the metal(s) brazed the with silicon, and their proportions, may lead to major unpredictable, unexpected changes in the properties of the composition, and in particular the mechanical properties thereof.

To conclude, there is no existing possibility for predicting the mechanics of a given Si—X system in which X is a metal, and even less so the mechanics of a system in relation to the proportions of X.

The brazing temperatures of the braze compositions in documents [1, 2] and [3] are generally higher than 1300° C. These brazing temperatures are for example 1355° C. for the Ti—Si composition (22-78%. by weight), 1355° C. for the Cr—Si composition (25-75% by weight), 1400° C. to 1450° C. for the Co—Si composition, and 1750° C. for the $Ru_2Si_3$ composition.

The efficacy of this assembly method requires brazing temperatures higher than 1300° C. to obtain thermodynamic de-stabilization of the passivating silicon oxide layers which occur spontaneously on the surfaces of silicon carbide, since these silicon oxide layers are detrimental to wetting by the braze composition, even when brazing is conducted in a vacuum.

Therefore, the above-mentioned braze alloys with high silicon content and used at a temperature higher than 1300° C. are not adapted to the brazing of substrates in silicon carbide-based material whose properties deteriorate after exposure to 1300° C., all the more so at 1250° C. and even at 1210° C. or lower. This is particularly the case of some SiC/SiC composites which deteriorate above 1300° C. even 1250° C.

Document [3], it is true, presents a braze composition of Ge—Si (90%-10%) which can be brazed at only 1220° C. However, the mechanical strength of this joint (tensile yield strength of about 300 and 400 p.s.i. i.e. between 2 and 2.75 MPa) is very low and insufficient for numerous applications and in particular the applications mainly concerned by this invention, despite the low reactivity of this braze material with SiC.

Document [2] proposes a Pt-Si alloy (Example 3) which is brazed at 1200° C. The Pt content of this braze composition is very high (77 weight % Pt) which leads to a very costly method. This drawback is prohibitive for the production of large-size brazed parts.

Finally, document [4] presents braze alloys having a Si content of less than 5% by weight, preferably 10 to 45% by weight, with the addition of at least 2 elements chosen from the following group: Li, Be, B, Na, Mg, P, Sc, Ti, V, Cr, Mn, Fe, Co, Zn, Ga, Ge, As, Rb, Y, Sb, Te, Cs, Pr, Nd, Ta, W and Tl.

Examples of document [4] describe ternary Si—Cr—Co braze compositions (11:38.5:50.5 weight %); Si—Cr—Co (40:26:34 weight %); Si—Fe—Cr (17.2: 17.5: 65.3 weight %); and Si—Fe—Co (20: 20: 60 weight %); and their brazing at temperatures of 1230° C., 1235° C., 1460° C. and 1500° C. respectively.

Regarding the braze compositions having brazing temperatures below 1300° C., it is merely mentioned that a <<strong>> bond is obtained but there is no mechanical testing of the joints to prove that good mechanical strength of the joints is effectively obtained. Similarly, the low SiC/braze reactivity is neither mentioned nor referred to.

In the light of the foregoing there is therefore a need, which as yet has not been met, for a method allowing the assembly of parts in silicon carbide-based materials by brazing, which ensures satisfactory mechanical strength of the assembly at between 20° C. and 1000° C. even 1100° C., in particular above 500° C. and up to 1000° C. even 1100° C., and optionally sealing of the joint. This method must allow the use in particular of brazing temperatures lower than 1300° C. which is a temperature which it is absolutely essential not to exceed for some substrates, parts to be assembled, that are SiC-based.

It is indeed essential that the parts, substrates, maintain their full integrity and initial performance levels after the assembly operation by brazing. There is therefore a need for a brazing method which uses braze compositions allowing the desired temperatures of use to be reached, namely up to 1000° C. even 1100° C., whilst avoiding the subjecting of the parts, substrates in silicon carbide-based materials to temperature ranges which could deteriorate these materials.

In other words there is a need for a brazing method which allows moderately refractory joints to be obtained (for uses at temperatures of up to around 1000° C. even 1100° C.) using brazing cycles which generally do not exceed a limit temperature defined as lying between 1210° C. and 1450° C. depending on the SiC-based material to be assembled.

Indeed, numerous silicon carbide-based materials, composite in particular, are irreversibly degraded on and after 1250° C.: this is notably the case for SiC/SiC composites with self-healing matrix in which glass protects the SiC fibers when operating in air at around 800° C. for example. Parts in silicon carbide with infiltrated silicon are destroyed on and after 1410° C. which is the melting point of silicon. On the other hand, pure silicon carbide withstands brazing at 1450° C. In other words, there is a need for a method and a braze composition, braze alloy, allowing firstly the use of the entire refractory potential of silicon carbide-based substrates having temperatures of use of up to around 1000° C. even 1100° C., and secondly allowing brazing to be performed at a brazing temperature lower than the degradation temperature of the substrates, with a brazing temperature of 1450° C. or lower, preferably in the range between 1210° C. and 1450° C., more preferably below 1300° C., and further preferably below 1250° C.

There is also a need for a method with which it is possible, by brazing at a temperature of 1450° C. or lower, preferably between 1210° C. and 1450° C., to produce a moderately refractory assembly (having a general temperature of use of between 1000° C. and 1100° C.), composed of parts in silicon carbide-based materials irrespective of their shape and/or size.

There is a particular need for a brazing method, and for the associated braze composition, which allows the brazing at a temperature lower than 1450° C., preferably between 1210° C. and 1450° C., of parts made of SiC having a large-size and/or complex geometries, particularly of parts having large surface areas to be brazed.

In addition, none of the methods and compositions of the prior art simultaneously meet the following criteria, evidenced by the. inventors, which are fundamental for producing moderately refractory SiC structural components comprising joints:

1) the braze composition must allow a strong bond to be obtained between the two parts in silicon carbide-based material, which necessitates a non-reactive braze composition i.e. chemically compatible with the silicon carbide, and which does not form fragile compounds therewith. However, non-reactivity does not guarantee the setting up of a strong bond since this remains unpredictable. Non-reactivity is a necessary condition to obtain a strong bond but it is insufficient however. For example the Fe—Si system cited in the literature [3] is non-reactive but its mechanical strength is very low;

2) the braze composition must properly wet the silicon carbide and adhere well thereto;

3) the braze composition must be compatible with all heating devices, in particular rapid and/or localized heating devices;

4) the braze composition must allow the forming of joints which display good mechanical strength;

5) the braze composition must be formed of a limited number of elements, to facilitate the preparation and the implementation thereof;

6) the braze composition must not contain any costly elements such as precious metals.

Finally, the method and the associated braze composition must allow the brazing, the assembling of any type of silicon carbide-based material, and must be able easily to adapt to any specific silicon carbide-based ceramic.

The goal of the invention is therefore to provide a method for assembling, by brazing, parts or components in silicon carbide-based materials, which inter alia meets the aforementioned needs and which inter alia fulfils all the requirements and criteria mentioned above, which eliminates the disadvantages, defects, limitations encountered with the prior art methods, and which solves the problems of the methods of the prior art.

In particular, the goal of the invention is to provide a method for assembling, by brazing, parts or components in silicon carbide-based materials which allows satisfactory mechanical strength of the assembly to be obtained at above 500° C. and up to 1000° C., even 1100° C., which uses brazing temperatures of 1450° C. or lower, preferably lying between 1210° C. and 1450° C., and more preferably lower than 1300° C., and which optionally allows joints to be obtained having an excellent seal.

SUMMARY OF CERTAIN INVENTIVE ASPECTS

This goal, and others, are achieved according to the invention by a method for assembling at least two parts made of silicon carbide-based materials by non-reactive brazing, wherein the parts are contacted with a non-reactive brazing composition, the assembly formed by the parts and the brazing composition is heated to a brazing temperature sufficient to melt the brazing composition, and the parts and the brazing composition are cooled so that, after solidification of said brazing composition, a moderately refractory joint is formed; in which the non-reactive brazing composition is a binary alloy composed (consisting) of 46% to 99% in mass percentages, silicon and 54% to 1% of neodymium.

In general, brazing is conducted at a brazing temperature of 1450° C. or lower, preferably of 1210° C. to 1450° C.

By moderately refractory joint is meant that this joint is generally capable of withstanding operating temperatures of up to 1000° C. even 1100° C., and generally in the region of 1000° C. even 1100° C.

The method of the invention, which is a brazing method at a temperature generally equal to or lower than 1450° C., preferably from 1210° C. to 1450° C., more preferably equal to or lower than 1300° C., using a specific brazing composition has never been disclosed in the prior art.

In particular, the specific braze composition used in the invention which, surprisingly allows the brazing at a temperature generally equal to or lower than 1450° C., preferably of 1210° C. to 1450° C., more preferably of 1300° C. or lower, of parts made of silicon carbide-based materials is in no way mentioned in the prior art documents cited above.

For example, document [4] incidentally mentions neodymium in a list of 27 elements, among which at least two must be chosen to form a braze composition with silicon, the content of this silicon at all times being less than 50 weight %. In this list Fe, Cr, Co, V, Zn, Ti and Y are preferred. Neodymium is therefore not cited among the preferred elements.

None of the particularly preferred braze alloys in this document which are alloys of silicon, chromium and cobalt, alloys of silicon chromium and iron, and alloys of silicon iron and cobalt, and none of the brazing compositions exemplified in this document contain rare earths, let alone, a fortiori, neodymium.

Additionally, the alloys described in this document are much more complex than the binary Si—Nd alloy used in the invention. The braze alloys in this document are, at the least, poly-constituted ternary alloys whose preparation and controlling of properties are much more difficult than for binary alloys.

The braze compositions of the examples given in document [4] are limited to the ternary systems SiFeCo, SiFeCr, SiCrCo with a Si content of less than 40% by weight. These compositions do not contain any rare earths and globally contain a much reduced number of elements compared with the list of 27 possible added elements. In particular, an alloy is proposed of 40% Si-26% Cr-34% Co (weight %) for use at around 1200° C. but no mechanical test is reported which could demonstrate the good mechanical strength of the joints. It is also to be added that the braze compositions according to the invention have silicon concentrations that are higher than 45% by weight i.e. a Si concentration higher than those indicated in document [4].

Document [4] does not contain any indication which could lead to preparing a binary braze alloy, since it concerns alloys containing at least three elements. Document [4] also does not contain any indication which could lead to choosing neodymium, and a fortiori a specific content thereof, to prepare a binary braze alloy compatible with SiC, and ensuring the brazing of SiC-based parts at a temperature equal to or lower than 1450° C., preferably between 1210° C. and 1450° C., more preferably of 1300° C. or lower than 1300° C., and the effective assembling of such parts.

The method according to the invention meets the needs, fulfils all the above-mentioned requirements and criteria and does not have the disadvantages of the prior art methods.

In particular, the method of the invention for the first time allows the preparation of moderately refractory assemblies i.e. having a temperature of use ranging up to 1000° C. even 1100° C. for parts made of silicon carbide-based materials, irrespective of their geometry, even very complex, and/or size.

The method of the invention in all cases particularly ensures good filling of the joint by brazing, excellent mechanical strength of the assembly at ambient and hot temperature, in particular at above 500° C. and up to 1000° C.-1100° C., and optionally good sealing of the joint.

The method of the invention is additionally simple, reliable, easy to implement and of overall low cost.

In other words, the multiple advantages and surprising effects of the invention can be listed as follows, without this list being construed as limiting:

in relation to the composition of the selected braze alloy, several brazing temperatures are possible between 1210° C. and 1450° C. and are therefore able to meet different specifications;

the assembly obtained according to the invention allows the guaranteed good mechanical adhering between the silicon carbide-based substrates even at maximum temperatures of use of more than 500° C. possibly reaching 1000° C. for example even 1100° C. Ruptures occur in "cohesive" mode i.e. cracks occur in the silicon carbide-based substrates and not at the brazed joint;

the brazing temperature may be equal to or lower than 1300° C. and it is therefore possible with the method of the invention to assemble parts, substrates made of silicon carbide which cannot withstand temperatures of more than 1300° C., even 1250° C. and even 1210° C., such as parts, substrates in a composite with ceramic matrix and ceramic fibers and self-healing matrix, or in silicon infiltrated SiC, SiSiC. In other words, the method of the invention allows the brazing of SiC-based materials which deteriorate on and after 1250° C., even 1210° C. The method according to the invention evidently applies to pure SiC e.g. sintered SiC for which brazing temperatures higher than 1300° C. can be used, but also to less stable materials using braze compositions adapted to these materials that have less heat stability.

surprisingly, despite the brazing temperature of generally less than 1450° C., preferably of 1210° C. to 1450° C., more preferably 1300° C. or lower, used in the method of the invention, good wetting was ascertained of the braze composition, of the braze alloy according to the invention, on the surfaces of the substrates, parts, in silicon carbide to be assembled. Therefore, by means of this good wetting of the surfaces, it is possible according to the invention to conduct capillary brazing since the braze composition of the invention alone is able to fill the joint between the parts during the brazing operation.

extremely moderate reactivity of the braze alloy on the silicon carbide-based substrates was observed. There are no porous, complex weakening regions at the interface.

the brazing performed with the method of the invention is reversible. It is therefore possible to disunite, separate the assembled parts, substrates, for example for the repair thereof, by melting the braze alloy in a furnace during a second melt operation of this braze alloy, without deteriorating the parts, substrates. The parts, substrates can also be separated by chemical attack. In other words, the method of the invention allows the repair of the assembled parts in silicon carbide-based material. This means that these parts may undergo a second brazing cycle if needed, to carry out a repair without deteriorating the properties of the joints. This repair capacity is possible due to the lack of reactivity or only scarce reactivity of the braze alloys used according to the invention with silicon carbide.

another remarkable property obtained with the method of the invention is the homogeneity of the joint obtained after brazing, and the very good mechanical behaviour of the formed joints.

it is not necessary, with the method of the invention, to metallize with braze the parts, substrates in SiC-based material before the brazing operation at a temperature lower than 1300° C., since the joints are well filled with the braze composition of the invention even in a capillary configuration;

it is additionally not necessary with the method of the invention to deposit carbon on the parts, substrates in SiC-based material before the brazing operation conducted in particular at a temperature of less than 1300° C. The wetting kinetics are fast and the wetting angle is very good (for example less than 20° in less than one minute) and the joints are well filled with the braze, brazing, composition of the invention, even in a capillary configuration;

the brazing compositions of the invention do not contain any precious chemical element, in particular no metals from the platinum family which limits their cost and the cost of the method using the same, compared with numerous compositions in the prior art;

the brazed joints obtained with the method of the invention are generally sealed. The method of the invention is therefore suitable for sealing operations in which the seals must withstand maximum temperatures of between 850° C. and 1100° C. depending on the composition of the braze alloy.

As already mentioned above the behaviour of brazing compositions, more particularly for brazing of SiC, is extremely unpredictable and cannot under any circumstances be inferred from the behaviour of similar brazing compositions.

For example, it has been evidenced that brazing compositions formed of binary Si—Y alloy (the Si concentration being from 56 to 70 weight %) and not Si—Nd, did not exhibit all the advantageous properties of the brazing compositions according to the invention and had numerous disadvantages compared with the brazing compositions used in the invention.

The wetting kinetics of SiC by the Si—Y alloy are distinctly slower than for the Si—Nd alloy of the present invention, and the stationary angle of contact is larger. After 10 minutes at 1255° C., the angle is 70°; the stationary angle is'reached in 30 minutes and has a value of 50°. The same results are obtained at 1270° C. To reduce the spreading kinetics of the Si—Y alloy it is necessary to observe a temperature hold for 90 minutes at 1135° C. before the brazing temperature hold at between 1255° C. and 1270° C. As a result, after 10 minutes the contact angle reaches 50°. After 30 minutes it is then slightly smaller than 50°. A carbon deposit on the SiC allows a slightly smaller stationary angle to be obtained of 40° in 15 minutes Example No °1 shows that, surprisingly, the wetting kinetics with the braze composition of the invention are extremely rapid even with a low brazing temperature. The stationary angle of contact is effectively obtained in less than one minute at 1240° C., and this stationary angle obtained is of the order of 20°.

Compression/shear tests comparable to those conducted on the Si—Y system were carried out at ambient temperature with the braze composition of the invention. The breaking stresses obtained with the Si—Nd alloy are very good and surprisingly higher than those obtained with Si—Y. For Si—Y, the breaking stress values are of the order of 25 MPa whereas they are much higher for Si—Nd with a mean value of the order of 76 MPa (see Examples 5, 7, 8, 9 and the comparative Example 11). The Si—Nd alloy of the present invention therefore provides numerous unexpected advantages compared with the Si—Y alloy.

Comparative compression/shear tests were also conducted at ambient temperature following the same protocol with another binary system containing silicon and another rare earth, element Ce (see comparative Example 12). The breaking stresses obtained with the Si—Nd alloy are surprisingly higher than those obtained with Si—Ce. For Si—Ce, the breaking stress values are of the order of 20 MPa whereas they are much higher for Si—Nd with a mean value of the order of 76 MPa (see Examples 5, 7, 8, 9 and comparison with Example 11).

The Si—Nd alloy of the present invention therefore provides numerous, unexpected advantages compared with the Si—Ce alloy.

The brazing composition of the invention is also defined by a specific silicon content over the range of 46 to 99% by mass. Surprisingly, it was ascertained that the advantageous properties of the brazing compositions according to the invention are only obtained within this specific range and not outside this range.

For Si—Nd alloys with silicon contents strictly lower than 46%, the brazing alloys are too refractory and would require brazing at between 1600° C. and 1460° C. In addition, the mechanical strength is not sufficient as shown by the comparative example No °10 with a breaking stress of 30 MPa under the compression/shear test for the alloy with 42% by mass Si and 58% by mass Nd, whereas the four brazing compositions according to the invention presented in the examples give breaking stresses that are higher even much higher than 52 MPa with a mean of 76 MPa (see Examples 5, 7, 8, 9).

Therefore, it could in no way be foreseen that in a method for brazing SiC-based parts the use of the specific composition of the invention defined by the association of a specific element: neodymium with silicon, in specific proportions, could allow brazing at a temperature of 1210 to 1450° C., preferably lower than 1300° C., with all the beneficial effects and advantages listed above, in particular with respect to sealing of the joint and the mechanical strength of the assembly at above 500° C. without deterioration of the parts.

The brazing composition of the invention may advantageously be composed (may consist) in mass percentages, of 48% to 51% silicon and 52% to 49% neodymium, for brazing at a temperature of between 1210° C. and 1250° C.

The brazing composition of the invention may advantageously be composed (may consist) in mass percentages, of 51% to 58% silicon and 49% to 42% neodymium, for brazing at a temperature of between 1250° C. and 1300° C. depending on the composition.

The brazing composition of the invention may advantageously be composed (may consist) in mass percentages, of 58% to 65% silicon and 42% to 35% neodymium, for brazing at a temperature of between 1300° C. and 1350° C. depending on the composition.

The brazing composition of the invention may advantageously be composed (may consist) in mass percentages, of 65% to 80% silicon and 35% to 20% neodymium, for brazing at a temperature of between 1350° C. and 1400° C. depending on the composition.

The brazing composition of the invention may advantageously be composed (may consist) in mass percentages, of 80% to 95% silicon and 20% to 5% neodymium, for brazing at a temperature of between 1400° C. and 1430° C. depending on the composition.

The brazing composition of the invention may advantageously be composed (may consist) in mass percentages, of 95% to 99% silicon and 5% to 1% neodymium, for brazing at a temperature of between 1430° C. and 1450° C. depending on the composition.

In particular, the brazing composition of the invention may advantageously be composed (may consist) in mass percentages, of 48.7% silicon and 51.3% neodymium for brazing at 1240° C.; or else the brazing composition of the invention may advantageously be composed (may consist) in mass percentages, of 60% silicon and 40% neodymium for brazing at 1315° C.; or else the brazing composition of the invention may advantageously be composed (may consist) in mass percentages, of 80% silicon and 20% neodymium for brazing at 1395° C.; or else the brazing composition of the invention may advantageously be composed (may consist) in mass percentages, of 95% silicon and 5% de neodymium for brazing at 1420° C.

The different brazing compositions defined by the advantageous percentages set forth above are a fortiori neither described nor suggested in the prior art.

Advantageously, before brazing, it is possible to add a reinforcement to the brazing composition.

This reinforcement made of a material chosen from among the ceramics such SiC, and C.

This reinforcement may be in the form of particles e.g. a powder; fibers; a non-woven made of fibers material; or a fibers fabric.

The adding of the reinforcement may be performed in a quantity of 5 to 49% by mass relative to the mass of the brazing composition.

Advantageously, in the method of the invention it is possible to form a powder of brazing composition, to place this powder in suspension in an organic binder to obtain a suspension or paste, and to coat at least one surface of the parts to be assembled with the suspension or paste obtained.

For example, it is possible to coat a surface to be assembled of at least one of the parts to be assembled with the suspension or paste, then to place in contact the surfaces of the parts to be assembled so that the suspension or paste is inter-positioned there between, or else the parts to be assembled can be contacted leaving an offset between them to form a surface able to receive the suspension or paste close to the joint formed by the surfaces to be assembled, of the parts to be assembled, and the suspension or paste may be deposited on this surface.

Before the placing in contact with the brazing composition, a deposit of carbon on at least one of the surfaces to be assembled of the parts is not necessary.

This is precisely another of the advantages of the method of the invention with Nd—Si compared with Y—Si for example, in that this carbon deposit can be dispensed with thereby avoiding an additional step in the brazing method.

Advantageously, the brazing can be conducted at a brazing temperature at least 15° C. higher, preferably at least 30° C. higher, than the melting point of the brazing composition.

Advantageously, brazing can be conducted by observing a brazing hold, plateau, at a brazing temperature of 1210° C. to 1450° C., held for a time of 15 to 90 minutes, preferably 20 to 90 minutes, more preferably 20 to 60 minutes, further preferably 20 to 30 minutes.

Preferably, the brazing hold, plateau, may take place at a brazing temperature of 1250° C. held for a time of 30 minutes for SiC-based substrates not withstanding temperatures higher than 1300° C. at which degradation of the substrate to be brazed occurs.

Advantageously, before the brazing hold, plateau, it is possible to conduct a first hold, plateau, at a temperature generally of 1080° C. to 1150° C., preferably 1100° C. to 1150° C., held for a time of 30 to 120 minutes, preferably 60 to 120 minutes, more preferably 90 to 120 minutes.

Advantageously the silicon carbide-based materials can be chosen from among pure silicon carbides such as pure α silicon carbide (α-SiC) or β silicon carbide (β-SiC) and from composite SiC-based materials such as composites with silicon carbide fibers and/or matrix.

More particularly, the silicon carbide-based materials may be chosen from among pressureless sintered silicon carbide ("PLS-SiC"); Si-infiltrated silicon carbide ("SiSiC" or "RBSC"); porous recrystallized silicon carbide ("RSiC"); silicon graphite ("C-SiC") composed of graphite coated with a layer of SiC; SiC/SiC composites e.g. with fibers or whiskers; SiC/SiC composites with self-healing matrix; C/SiC composites e.g. with carbon fibers or whiskers and a SiC matrix; SiC monocrystals; SiC composites with another ceramic e.g. SiC/$Si_3N_4$ and SiC/TiN composites.

In general, the said silicon carbide-based materials have a silicon carbide content of at least 50 mass %, preferably at least 80 mass %, and further preferably of 100 mass %.

The invention also pertains to a method for assembling, by brazing, at least three parts made of silicon carbide-based materials, in which the following successive steps are performed:

a) at a brazing temperature T1, at least two parts made of silicon carbide-based materials are assembled by brazing, using a brazing composition composed of a binary alloy of silicon and of an element X, the said alloy being more refractory than the binary alloy composed, as mass percentages, of 46% to 99% silicon and 54% to 1% neodymium, preferably than the binary allow composed, as mass percentages, of 46% to 65% silicon and 54% to 35% neodymium; further preferably than the binary alloy composed, as mass percentages, of 46% to 60% silicon and 54% to 40% neodymium; whereby a first assembly of at least two parts is obtained;

b) at a brazing temperature T2, using the brazing method for assembling at least two parts made of SiC-based materials described above (which uses a non-reactive brazing composition which is a binary alloy composed, as mass percentages, of 46% to 99% silicon and 54% to 1% neodymium) at least one other part made of a silicon carbide-based material is assembled with the assembly of at least two parts obtained in step a).

Advantageously, T1 is higher than T2 by at least 40° C.

Advantageously, X is chosen from among Ti, Zr, V, Ru, Re, Hf, Cr and Rh.

Advantageously, the binary alloy of silicon and an element X has a melting point higher than 1350° C., and temperature T1 is 1400 to 1450° C.

The invention also concerns the brazing compositions described above in the description of the method of the invention.

The invention also relates to a composition for the non-reactive, moderately refractory brazing of parts made of a silicon carbide-based material, comprising a non-reactive brazing composition such as defined above, and in addition an added reinforcement such as defined above.

The invention further relates to a brazing paste, suspension for the non-reactive moderately refractory brazing of parts made of silicon carbide-based materials, comprising a powder of a brazing composition according to the invention, such as defined above, and a liquid organic cement, binder.

The invention further concerns the moderately refractory joint and the assembly comprising at least two parts made of SiC-based materials, obtained by the method of the invention as described above.

Other features and advantages of the invention will become better apparent on reading the following description, given solely as an illustration and non-limiting, in connection with the appended drawings, in which:

BRIEF DESCRIPTION OF THE DRAWINGS

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

DETAILED DESCRIPTION OF CERTAIN ILLUSTRATIVE EMBODIMENTS

Figure 1:
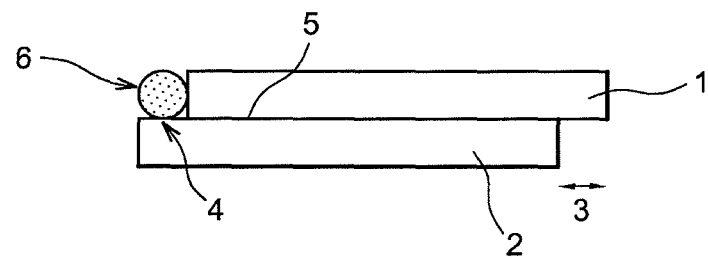
FIG. 1 is a schematic view showing the arrangement of the plates in SiC-based material and brazing paste composition for brazing in capillary configuration.

The first step of the method according to the invention generally first consists of preparing, forming a braze, brazing, composition in other words a braze, brazing alloy containing silicon and neodymium.

The braze, brazing alloy of the invention is a binary neodymium (Nd)-Silicon (Si) alloy.

The melting point of the braze alloy of the invention is generally from 1195° C. to 1420° C., preferably it is equal to or lower than 1300° C. The predominant element of the alloy is silicon.

The weight proportions of the Si—Nd alloy are 46% to 99% silicon and 54% to 1% neodymium.

Advantageous proportions and particularly advantageous proportions were indicated in the foregoing.

The brazing composition is generally a powder composition which can be prepared for example by first synthesizing from pure elements an inter-metallic compound containing silicon and neodymium.

The synthesis of said inter-metallic compound is obtained for example by adding silicon e.g. in the form of pieces and neodymium e.g. in the form of pieces or otherwise, in the desired proportions for the braze composition, to a refractory crucible in alumina for example.

The assembly formed by the crucible, silicon and neodymium is placed in heating apparatus such as a furnace and is heated to a temperature generally of 1330° C. to 1450° C., preferably under argon, to melt the different constituents of the braze composition and after cooling to obtain the desired final inter-metallic compound, that is homogeneous and in ingot form. The heating temperature is preferably 1330° C. for compositions containing 46% to 52% by weight of silicon, and it is preferably 1450° C. for compositions with higher silicon contents. The inter-metallic compound obtained is then ground in any suitable apparatus e.g. a mortar to obtain a powder of suitable particle size, i.e. whose particles have a diameter of 1 to 300 μm for example which forms the braze composition.

Or else, the binary braze composition of the invention can be prepared for example by weighing a powder of pure silicon and a powder of the inter-metallic compound $NdSi_2$ within the proportions chosen for the braze composition of the invention, and then mixing these powders in a <<Turbula>> for at least 30 minutes.

The powder composed of the mixture of powders of the inter-metallic compound and Si, in this case, constitutes the braze composition.

The said inter-metallic compound can be synthesized, or it may be a commercial compound in the form of a powder of the inter-metallic compound of known particle size and purity. Among these commercially available powders mention may be for example of: the powder of the compound $NdSi_2$ sold under the Neyco® trademark, having 99.9% purity and a particle size of 50 to 100 μm.

The powder of pure silicon can be prepared from pieces of pure silicon ground in any suitable apparatus e.g. a mortar, to obtain a powder of suitable particle size whose particles have a diameter of 1 to 250 μm for example.

Instead of being thus prepared, the said powder of pure silicon can also be a commercially available powder of known particle size and purity. Among these commercial powders mention may be made for example of: the pure Si powder marketed under the trade name CERAC®, having a purity of 99.5% or 99.99% and a particle size of the order of 50 μm.

According to the invention, it is possible also to add a reinforcement to the braze composition before brazing, in particular to improve the mechanical strength of the assembly.

This reinforcement may be a reinforcement of C or of a ceramic such as SiC.

This reinforcement may be in the form of particles e.g. a powder such as a SiC powder; fibers for example SiC or ceramic fibers; a non-woven in which the fibers are isolated; or a fibers fabric.

The added reinforcement such as a SiC powder generally represents 5 to 49% by weight of the brazing composition. The SiC powder may for example be a commercial powder such as the powder of STARCK® trademark having a purity of 98.5% and of particle size less than 10 μm.

The brazing powder composition (Si and Nd) to which a reinforcement has optionally been added such as a SiC powder, is placed in suspension as is conventional in a liquid organic binder, cement, gel, that is preferably both viscous and tacky to obtain a paste, suspension of braze composition optionally containing a reinforcement allowing homogeneous spreading on the surfaces of the parts, substrates made of silicon carbide-based material to be brazed.

The binder, cement, gel generally decomposes at between 100 and 300° C. for example without leaving any traces. It may be a cement of NICROBRAZ® type, or a gel (Vitta® gel).

The second step of the method according to the invention generally consists in forming the assembly with the actual brazing operation.

Prior to assembling, the two (or more) surfaces of the parts in SiC-based materials to be assembled are generally degreased, cleaned in an organic solvent e.g. of ketone, ester, ether, alcohol, type or a mixture thereof, etc.

One preferred solvent is acetone or a mixture of acetone/ ethyl alcohol/ether e.g. in the proportions of 1:3, 1:3, 1:3; the parts can also be successively cleaned in several different solvents, for example with acetone then with ethanol. The parts are then dried.

The parts made of SiC-based materials to be assembled are generally two in number, but it is also possible simultaneously to assemble a larger number of parts of possibly up to 100.

By part made of SiC-based material is generally meant any element or entity of any shape and size which, after assembly with one or more other parts, forms part of a structure of larger dimension.

According to the invention, it is possible, each time with excellent results, to assemble parts of complex geometry or shape and/or of large size, for example having a braze surface of 0.5 m$^2$ or more.

By silicon carbide-based material is generally meant herein all materials containing at least 50% by mass of silicon carbide; preferably at least 80% by mass of silicon carbide, more preferably 100% by mass of silicon carbide, in this latter case the material is composed solely of, consists solely of, silicon carbide.

The silicon carbide-based materials may be chosen from among pure silicon carbides such as α (α-SiC) or β (β-SiC) pure silicon carbide, and composite SiC-based materials such as composites with silicon carbide fibers and/or matrix.

As examples of SiC-based materials, mention may be made of pure dense silicon carbide or pressureless sintered silicon carbide ("PLS-SiC"); Si-infiltrated silicon carbide (called SiSiC or RBSC containing 5 to 20% Si); porous, recrystallized silicon carbide (called RSiC); silicon graphite (C-SiC) formed of graphite coated with a SiC layer of thickness 0.1 to 1 mm for example; and the SiC/SiC composites, for example fiber or whisker composites; SiC/SiC composites with self-healing matrix; C/SiC composites, for example with carbon fibers or whiskers and SiC matrix; also SiC monocrystals; and SiC composites with another ceramic e.g. SiC/Si$_3$N$_4$ and SiC/TiN composites.

It was surprisingly ascertained that the method of the invention allowed the brazing of composites with excellent results.

The two or more parts to be assembled may be made of one same silicon carbide-based material, e.g. made of PLS (<<Pressureless Sintered>>)—SiC, or made of SiC—SiC composite, or each of the parts may be in a different material.

Figure 3:
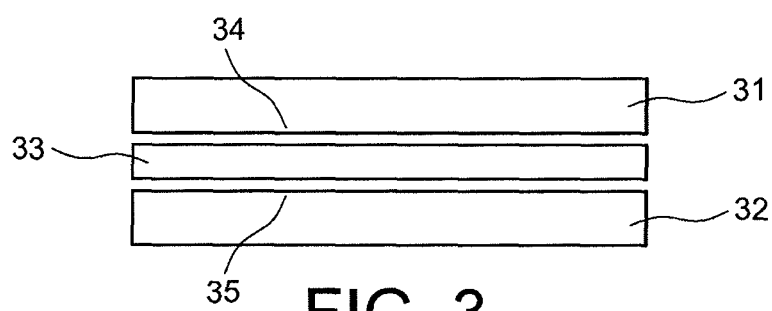
FIG. 3 is a schematic view showing the arrangement of the plates in SiC-based material and the braze composition paste for brazing in <<sandwich>> configuration.

The suspension, paste of brazing composition previously described is spread, coated, applied homogeneously, uniformly using a brush, spatula, paintbrush for example or using a syringe optionally attached to a robot system, or using any other means allowing the depositing of a uniform layer of braze paste on the surface of at least one of the parts in silicon carbide-based material to be assembled. The surface(s) coated with paste of the two parts (31, 32) to be assembled are then placed in contact. This brazing configuration, illustrated in FIG. 3, is called the <<sandwich configuration>> since the braze paste composition (33) is placed directly between the surfaces (34, 35) of the parts to be assembled.

The quantity of paste, suspension of braze composition to be used in this configuration is generally 10 mg/cm$^2$ to 30 mg/cm$^2$, for example 20 mg/cm$^2$.

The <<sandwich>> configuration applies both to <<thin>> joints i.e. having a thickness of less than 200 micrometers, and to thick joints i.e. with a thickness of 200 micrometers or over.

Or, as is illustrated in FIG. 1, the parts to be assembled, for example in the form of plates (1, 2), are placed in contact without placing any braze composition there between by leaving a gap, an offset (3) between them, generally of a few mm, for example of 1 mm, 2 mm, to 10 mm so as to create a surface (4) able to receive the suspension or paste in the vicinity of the joint (5) formed by the surfaces to be assembled, then the suspension or paste of braze composition is deposited for example as a braze bead (6) on this surface in the vicinity of the joint, close to the joint, on the edge of the joint. During the heating cycle for brazing, the liquid brazing composition infiltrates inside the joint.

This brazing configuration is called a <<capillary configuration>>. With the brazing compositions of the invention, it is possible to carry out said capillary brazing, with infiltration of the liquid braze inside the braze joint during the brazing cycle, without depositing the braze composition directly between the parts to be assembled as in the <<sandwich configuration>>.

The quantity of paste, suspension of brazing composition to be used in this capillary configuration is generally 10 mg/cm$^2$ to 30 mg/cm$^2$, for example 20 mg/cm$^2$.

Capillary brazing is possible for <<thin>> joints having a thickness of less than 200 micrometers with no reinforcements previously placed in the joint.

Capillary brazing can also be possible for much greater joint thicknesses possibly reaching a few millimeters for example, for joints in which a <<wetting reinforcement>> (i.e. the braze obtains good wetting of the reinforcement surface as is the case for SiC-based reinforcements for example) with the braze composition has been deposited between the surfaces to be brazed. This reinforcement may be formed of ceramic particles for example such as SiC, ceramic fibers such as SiC, particles of C, fibers of SiC. The braze composition, placed on the edge of the joint, changes to liquid state during the brazing cycle and infiltrates the joint, wetting the reinforcements. The reinforcements therefore allow infiltration into thick joints. The joint is generally formed of at least 50% by volume of Si—Nd alloy, this alloy having a composition of between 46% and 99% by weight for silicon and between 54% and 1% by weight for neodymium, with in general no more than 50% by volume of reinforcements.

The parts ready to be brazed are then placed in a heating device such as a furnace or subjected to heating using any other suitable means.

The furnace is generally under vacuum or under a neutral gas atmosphere.

In general, the vacuum is a high vacuum i.e. the pressure is from $10^{-3}$ to $10^{-5}$ Pa, for example it is $10^{-4}$ Pa.

Preferably, the neutral gas is argon.

The invention even allows the use of argon of commercial quality (generally with 5 ppm O$_2$).

The parts to be assembled are subjected to a heating cycle for example in the furnace.

For example, the assembly formed by the parts and the braze composition can be brought to the brazing temperature preferably by observing a <<slow>> temperature rise, with one or temperature ramps from ambient temperature.

This rise in temperature can be conducted for example with a temperature ramp at the rate of 1° C. to 5° C./minute.

The brazing temperature hold, plateau, is generally performed at a temperature, which is the brazing temperature, that is preferably at least 15° C., more preferably at least 30° C. higher than the melting point or liquidus temperature of the brazing composition, the chosen braze alloy. This brazing temperature is generally 1210° C. to 1450° C. depending on the brazing composition and the relative proportions of Nd and Si in this composition.

Depending on compositions, the liquidus temperature effectively varies in general from 1195° C. to 1420° C. and the brazing temperature will vary accordingly, for example as specified above from 1210° C. to 1450° C.

The temperature of 1210° C. has been mentioned as the lowest point for the brazing temperature since the method is operative even with a difference of 15° C. between the melting point and the brazing temperature, however a difference of at least 30° C. is generally preferable for large parts, and the lowest brazing temperature is then 1225° C. Similarly, the highest brazing temperature may be 1435° C.

Such a melting point of the compositions, according to another advantage of the method of the invention, allows use of the assembly at up to 1000° C. and even at up to 1100° C.

For brazing at the lowest temperatures i.e. at a brazing temperature of between 1210° C. and 1250° C., the recommended composition is between 46% and 52% by mass Si (i.e. between 54% and 48% by mass Nd).

For higher Si contents, the brazing temperatures are higher, typically of the order of 1300° C. for between 53 mass % and 58 mass % Si, and of the order of 1350° C. for between 59 mass % and 65 mass % Si, and finally from 1350° C. to 1450° C. for between 66 mass % and 99 mass % Si (see examples).

Surprisingly, although the brazing temperature is lower than 1300° C. for braze compositions having between 46 mass % and 52 mass % Si (i.e. between 54 mass % and 48 mass % Nd), excellent adhesion and good wetting of the silicon carbide are obtained with very fast kinetics, as shown by the sessile drop test performed with these braze compositions, and it is therefore possible (see Example 1) to obtain a stationary contact angle of the order of 20° in less than one minute.

This excellent wetting is essential to obtain formed joints of good quality since it ensures good quality filling of the joint, but it does not always guarantee good mechanical behaviour since this latter property is unpredictable. Yet, surprisingly, the joints prepared with the braze compositions of the invention also have excellent mechanical properties.

This wetting is evidently just as good for the compositions with higher silicon content used at higher temperatures (see Examples 2, 3 and 4).

The brazing temperature defined above is held for a time of 15 to 90 minutes, preferably 20 to 60 minutes, for example for 30 minutes, this being called the brazing plateau.

The duration of the brazing plateau is dependent upon the size of the parts to be assembled. It is possible to hold the temperature for up to 60 minutes for very large parts with large surface areas to be brazed, namely typically at least 50×50 mm$^2$.

A brazing plateau in the method of the invention may be conducted for example at a brazing temperature of 1210° C. to 1450° C. for a time of 30 minutes.

The specific temperature of the brazing plateau is chosen in relation to the composition of the brazing alloy.

A homogenizing plateau at 1100° C. for example is recommended and even essential for large parts (typically on and after 50×50 mm$^2$) to guarantee the thermal homogeneity of the parts to be assembled.

It is to be noted that, since the wetting kinetics are already very good, it is not necessary to accelerate wetting which is already excellent, this first temperature hold for the Nd—Si compositions of the invention being essentially even solely conducted as a homogenizing plateau.

This (temperature) hold, plateau can be replaced by a slow rise in temperature, for example up to 1100° C.

The duration of the first (temperature) plateau depends on the size of the furnace, the size of the parts to be brazed and the tooling used to support the parts to be brazed.

This first plateau which is therefore a homogenization plateau is generally observed at a temperature of 1080° C. to 1150° C. e.g. 1100° C. for a minimum recommended time of one hour, for example for a time of 60 to 120 minutes before conducting the actual brazing temperature hold under the conditions already mentioned above.

Both in the capillary configuration and in the <<sandwich>> configuration, the said first plateau is not essential for small parts. Said first plateau is generally recommended even essential, in said two configurations, for large parts, namely parts which in general have brazing surfaces of more than 50×50 mm$^2$, in order to guarantee thermal homogeneity of the parts to be assembled.

The duration of these plateaus can be increased and may be set for example at 120 minutes for the first plateau and 90 minutes for the second plateau for parts of very large size, for example with a brazing surface of 0.5 m$^2$ or more Or else, thermal homogenization can also be obtained by eliminating this first plateau and by conducting a slow temperature rise (for example at the rate of 0.5° C./minute generally between 1080° C. and 1150° C., preferably between 1100° C. and 1150° C., so that the exposure time of the assembly to this temperature range is of the order of 60 to 90 minutes for example.

Similar to the first plateau, such a slow temperature rise is advisable even essential for large parts in both configurations.

On completion of the brazing cycle, after the brazing plateau, the assembly is cooled down to ambient temperature at the rate of 5° C. or 6° C. per minute for example.

Throughout cooling, the braze alloy solidifies and the assembling of the parts is effectively obtained whether using a <<sandwich>> configuration or a <<capillary>> configuration.

The assemblies produced with the method of the invention were subjected to compression/shear tests (see FIG. 2) at ambient temperature. The mean tensile strength was 76 MPa.

As already specified, this mechanical strength can be further improved by adding reinforcements to the braze composition.

Finally, the invention also allows complex objects to be produced using firstly a binary Si—Nd alloy whose composition ranges from 46% to 99% by mass for silicon and from 54% and 1% by mass for neodymium, and secondly an alloy of another Si—X system that is more refractory than Si—Nd.

The principle consists, at a first step, of brazing a first set of elements, parts (this assembly comprises m elements, where m is an integer from 2 to 10) made of SiC-based material, using the most refractory alloy Si—X at a brazing temperature T1. Then, at a second step, this first assembly is completed by brazing other elements, parts made of silicon carbide-based materials (totalling n in number, n being an integer from 1 to 10), onto the first assembly, with the method of the invention, using a second Si—Nd brazing alloy at a brazing temperature T2 such that T2 is lower than T1.

Finally, an assembly is obtained of m+n parts.

In practice, it is recommended that the difference between T1 and T2 be at least 40° C. so that the joints formed at the first assembly do not melt during the second brazing cycle. The composition of the Si—Nd alloy must be chosen to pay heed to the temperature difference of at least 40° C. between the first brazing with Si—X and the second brazing with Si—Nd. Among the possible Si—X alloys for the first brazing, mention may be made of the Ti—Si, Zr—Si, V—Si, Ru—Si, Re—Si, Hf—Si, Cr—Si, Rh—Si systems. For example the composition range of between 46% and 65% by weight for silicon and 54% and 35% by weight for neodymium is well adapted for association with Si—X systems having alloys melting at above 1350° C. and allowing brazing between 1400 and 1450° C. Two examples of brazing with two Si—Nd braze compositions were carried out and are detailed in the present invention (Examples 13 and 14).

The assemblies of parts in silicon carbide comprising joints prepared with the method of the invention allow structures, apparatus, components of complex shapes to be produced with great precision which have high temperatures of use possibly reaching up to 1000° C. even 1100° C.

It is indeed known that the properties of silicon carbide:
high hardness;
high rigidity;
low density;
low coefficient of expansion;
high breaking stress;
good resistance to heat shock;
and its very good conductivity mean that it is an indispensable material for present and future industrial applications, in particular high temperature applications.

In addition, SiC has very good chemical resistance to various acids, including hydrofluoric acid, and very good resistance to oxidation in air at high temperatures of up to 1300° C.

In other words, the method of the invention may apply in particular to the manufacture of any device, apparatus, structure, component requiring moderately refractory assembling between at least two silicon carbide-based substrates, parts, guaranteeing both good mechanical strength and satisfactory sealing of the assembly.

This type of device, apparatus, structure, component is able to meet needs in different fields:
the field of heat engineering, in particular for designing top performance heat exchangers since silicon carbide has very good heat conductivity and good resistance to high temperatures in extreme environments;
the field of mechanical engineering to manufacture on-board devices for lightweight, rigid, refractory components having resistance to abrasion and mechanical stresses;
the field of chemical engineering since silicon carbide resists against numerous corrosive chemical products such as strong bases and acids;
the field of nuclear engineering for producing fuel cladding;
the fields of spatial optics (telescope mirrors in SiC) and aeronautics (parts in SiC/SiC composite).
power electronics using SiC substrates.

The invention will now be described by means of the following examples which evidently are given for illustration only and are non-limiting.

EXAMPLE 1

This example describes sessile drop tests carried out with a brazing composition, alloy of the invention composed of 48.7% by mass Si and 51.3% by mass Nd on pure sintered α-SiC, observing a single brazing (temperature) plateau at 1240° C.

a) Preparation of the Brazing Composition and Brazing Paste

The targeted brazing composition of 48.7% by mass Si and 51.3% by mass Nd was prepared from pieces of pure Si and pieces of pure Nd.

These pieces were weighed paying heed to the proportions of the brazing composition and placed in a crucible made of alumina. The whole was placed in a furnace and subjected to a heating cycle with a temperature hold at 1330° C. under argon for one hour.

After cooling, an ingot was thus obtained. This ingot was ground to obtain a powder.

An organic binder (NICROBRAZ® cement) was added to this powder mixture to form a viscous paste.

b) <<Sessile Drop>> Test at 1240° C.

The brazing paste thus prepared was used to form a small deposit of braze weighing in the order of 50 mg. This braze deposit was deposited on a previously cleaned SiC plate.

The plate with the braze deposit was placed in a brazing furnace and subjected to a brazing heat cycle under a high vacuum, with only one (temperature) plateau, which is the brazing plateau at 1240° C.

The braze deposit melts during this heat treatment and forms a drop that is called a <<sessile drop>>.

The wetting, contact angle of the drop was measured in situ at different times of the brazing plateau.

In less than one minute at 1240° C., a wetting angle of about 20° was observed. After one hour at 1240° C. the angle was still of the order of 20°, this corresponding to the stationary angle.

After solidification, the SiC and its solidified drop of braze were cut, coated and polished and observed under a scanning electron microscope.

The SiC/braze interface did not exhibit any reactivity on the scale of scanning electron microscopy, i.e. there was no formation of a new compound. In particular, there was no formation of fragile compounds at the interface.

EXAMPLE 2

This example describes sessile drop tests conducted with a brazing composition, alloy according to the invention having a composition of 60% by mass Si and 40% by mass Nd on pure sintered α-SiC, observing a single brazing plateau at 1315° C.

a) Preparation of the Brazing Composition and Brazing Paste

The targeted brazing composition of 60% by mass Si and 40% by mass Nd was prepared from pieces of pure Si and pieces of pure Nd.

These pieces were weighed paying heed to the proportions of the brazing composition and placed in a crucible made of alumina. These were placed in a furnace and subjected to a heating cycle with a plateau at 1440° C. under argon for one hour. After cooling, an ingot was obtained. This ingot was crushed to obtain a powder.

An organic binder (NICROBRAZ® cement) was added to this powder mixture to form a viscous paste.

b) <<Sessile Drop>> Test at 1315° C.

The brazing paste thus prepared was used to form a small deposit of braze having a mass of about 50 mg. This braze deposit was deposited on a previously cleaned SiC plate.

The braze deposit and plate were placed in a brazing furnace and subjected to a brazing heat cycle under a high vacuum, with only one (temperature) plateau, which is the brazing plateau at 1315° C.

The braze deposit melts during this heat treatment and forms a drop that is called a <21 sessile drop>>.

The wetting, contact angle of the drop was measured in situ at different times of the brazing plateau.

The contact angle was very small and reached about 15° already after 3 minutes at 1315° C., which corresponds to the stationary angle.

After solidifying, the SiC and its solidified braze drop were cut, coated and polished and observed under scanning electron microscopy.

The SiC/braze interface did not show any reactivity on the scale of scanning electron microscopy i.e. there was no formation of a new compound. In particular, there was no formation of fragile compounds at the interface.

EXAMPLE 3

This example describes sessile drop tests conducted with a brazing composition, alloy of the invention having a composition of 80% by mass Si and 20% by mass Nd on pure sintered α-SiC, observing a single brazing temperature plateau at 1395° C.

a) Preparation of the Brazing Composition and of the Brazing Paste

The targeted brazing composition of 80% by mass Si and 20% by mass Nd was prepared from pieces of pure Si and pieces of pure Nd.

These pieces were weighed paying heed to the proportions of the brazing composition and placed in a crucible made of alumina. This was placed in a furnace and subjected to a heating cycle with a plateau at 1440° C. under argon for one hour. After cooling, an ingot was obtained. This ingot was crushed to obtain a powder.

An organic binder (NICROBRAZ® cement) was added to this powder mixture to form a viscous paste.

b) <<Sessile Drop>> Test at 1395° C.

The brazing paste thus prepared was used to form a small deposit of braze having a mass of about 50 mg. This braze deposit was deposited on a previously cleaned SiC plate.

The braze deposit and plate were placed in a brazing furnace and subjected to a brazing heating cycle under a high vacuum, with a single plateau, which is the brazing plateau at 1395° C.

The braze deposit melts during this heat treatment and forms a drop that is called a <<sessile drop>>.

The wetting, contact angle was measured in situ at different times of the brazing plateau.

After 30 seconds at 1395° C., a wetting angle of the order of 20° was observed. This angle corresponds to the stationary angle.

After solidification, the SiC and its drop of solidified braze were cut, coated and polished and observed under scanning electron microscope.

The SiC/braze interface did not show any reactivity on the scale of scanning electron microscopy i.e. there was no formation of a new compound. In particular, there was no formation of fragile compounds at the interface.

EXAMPLE 4

This example describes sessile drop tests conducted with a braze composition, alloy of the invention having a composition of 95% by mass Si and 5% by mass Nd on pure sintered α-SiC, observing a single brazing plateau at 1420° C.

a) Preparation of the Brazing Composition and of the Brazing Paste

The targeted brazing composition of 95 mass % Si and 5 mass % Nd was prepared from pieces of pure Si and pieces of pure Nd.

These pieces were weighed observing the proportions of the brazing composition and placed in a crucible made of alumina. These were placed in a furnace and subjected to a heating cycle with a plateau at 1440° C. under argon for one hour. After cooling, an ingot was obtained. This ingot was crushed to obtain a powder.

An organic binder (NICROBRAZ® cement) was added to this powder mixture to form a viscous paste.

b) <<Sessile Drop>> Test at 1420° C.

The brazing paste thus prepared was used to form a small deposit of braze having a mass of about 50 mg. This braze deposit was deposited on a previously cleaned SiC plate.

The braze deposit and plate were placed in a brazing furnace and subjected to a brazing heating cycle under a high vacuum, with a single plateau which is the brazing plateau at 1420° C.

The deposit of braze melts during this heat treatment and forms a drop called a <<sessile drop>>.

The wetting, contact angle was measured in situ at different times of the brazing plateau.

After 15 seconds at 1420° C., a wetting angle of about 20° was observed. This angle corresponds to the stationary angle.

After solidification, the SiC and its drop of solidified braze were cut, coated and polished and observed under scanning electron microscope.

The SiC/braze interface did not show any reactivity on the scale of scanning electron microscopy i.e. there was no formation of a new compound. In particular, there was no formation of fragile compounds at the interface.

Examples 5 to 10 describe assembling experiments by brazing.

EXAMPLE 5

This example describes the preparation of bonds, assemblies between two parts made of pure, sintered α-SiC silicon carbide, using the brazing method of the invention, brazing being conducted in capillary configuration using a brazing composition of the invention composed of 48.7% by mass Si and 51.3% by mass Nd.

This example also describes mechanical tests performed on these assemblies.

a) Preparation of the Brazing Composition, of the Brazing Paste, and of the Parts to be Assembled The targeted brazing composition namely 48.7% by mass Si and 51.3% by mass Nd was prepared as in Example 1.

An organic binder (NICROBRAZ® cement) was added to the powder mixture obtained to form a viscous brazing paste.

The sintered SiC parts to be assembled were plates of size 20×10 mm$^2$ and of thickness 1.5 mm.

The parts were cleaned with acetone, then with ethanol, and finally dried.

The substrates, parts were contacted leaving a slight offset of 1 to 2 mm, so as to leave a space for depositing the brazing paste close to the joint (this configuration is called a capillary configuration). The paste was deposited with a spatula on the free surface at the edge of the joint, in the form of a bead of braze material (see FIG. 1). The quantity of paste deposited was between 40 and 60 mg for this assembly.

b) Brazing

The parts placed in contact and ready to be brazed were placed in a brazing furnace under a high vacuum and subjected to a vacuum brazing heat cycle which comprised a single plateau of 20 minutes at 1250° C., which is the brazing plateau.

Figure 4:
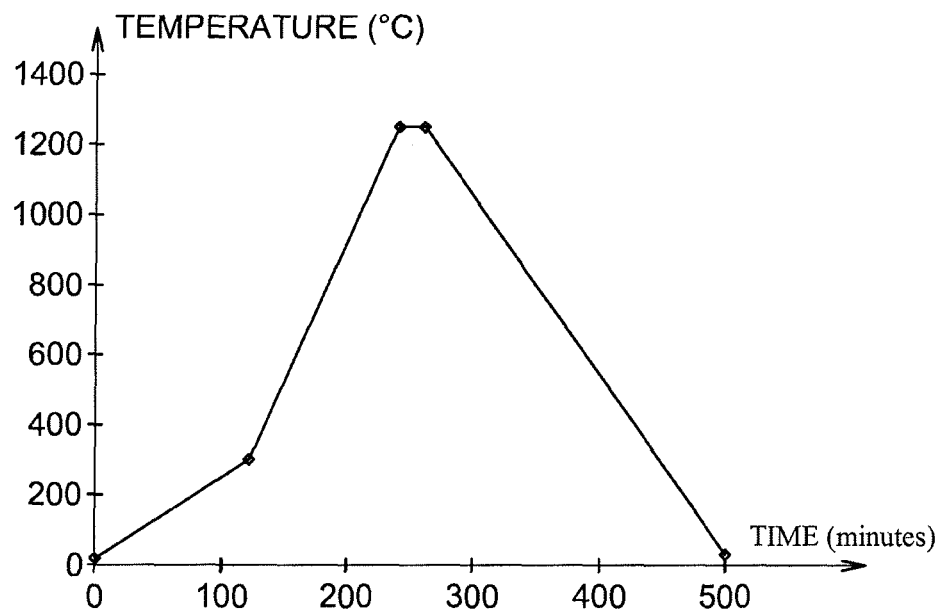
FIG. 4 is a graph showing the heating cycle for brazing used in Example 5. The time in minutes is given along the X-axis from the start of the heat treatment, and the temperature T in ° C. is given along the Y-axis.

The heating cycle is shown in FIG. 4.

c) Observation of the Joint

After cooling, the assembly was well joined. The joint was characterized under scanning electron microscope. There was no <<void>> and no reactivity was evidenced on the scale of observation under scanning electron microscopy.

d) Preparation of Mechanical Test Specimens and Results of Mechanical Tests

Test specimens (3 specimens) for mechanical testing were prepared by brazing 2 parts each of size 20×10×1.5 mm$^3$ (the thickness of the brazed test specimen was therefore 1.5+ 1.5=3 mm) (21, 22) with the brazing paste prepared at a) above and under the brazing conditions described at b) above. Since the mechanics of ceramics are statistical, more than one test specimen was prepared for testing but following the same method of production.

Figure 2:
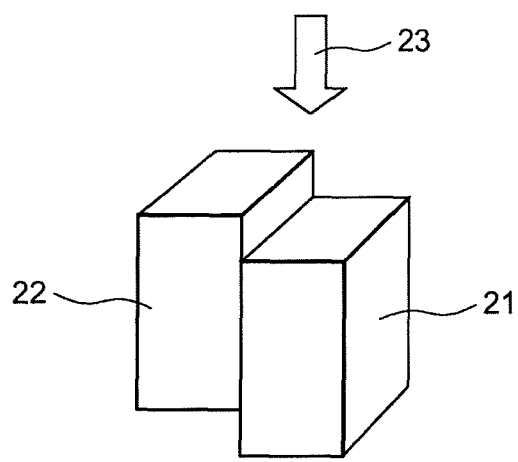
FIG. 2 is a schematic view of the test specimens used for the mechanical tests, in particular compression/shear tests of the joints and assemblies prepared in the examples.

The test specimens are schematized in FIG. 2. They were held stationary in a mount and placed under shear stress during a compression/shear test (23) at ambient temperature.

It is to be noted that this test does not allow guaranteed pure shear, but it is the preferred mode. However this test does allow a comparison between the assemblies.

Results of the Mechanical Tests:

The breaking stresses determined for each of the 3 test specimens were 63 MPa; 61 MPa; and 62 MPa; i.e. a mean value of 62 MPa.

It is to be noted that the values of the breaking stresses of the joints, assemblies of the type SiC/braze with high Si content/SiC may be more or less dispersed due to the fragile nature of ceramic materials.

EXAMPLE 6

This example describes the preparation of bonds, assemblies between two parts made of pure, sintered α-SiC silicon carbide using the brazing method of the invention, brazing being conducted in <<sandwich>> configuration using a brazing composition of the invention composed of 48.7% by mass Si and 51.3% by mass Nd.

a) Preparation of the Brazing Composition, of the Brazing Paste and of the Parts to be Assembled The targeted brazing composition, namely 48.7% by mass Si and 51.3% by mass Nd was prepared in the manner described in Example 1.

An organic binder (NICROBRAZ® cement) was added to the powder mixture obtained to form a viscous braze paste.

The parts made of sintered SiC to be assembled were plates of size 15×15 mm$^2$ and of thickness 1 mm.

The parts were cleaned with acetone, then with ethanol, and finally dried.

The brazing paste was spread with a brush onto the surfaces of the substrates, parts made of SiC to be assembled. The surfaces coated with the paste were then placed in contact (FIG. 3.).

The amount of deposited paste was between 40 and 60 mg for this assembly.

b) Brazing

The parts placed in contact and ready to be brazed were placed in a high vacuum brazing furnace and subjected, as in Example 5, to a vacuum brazing heat cycle comprising a single plateau for 20 minutes at 1250° C., which is the brazing plateau.

The heating cycle is illustrated in FIG. 4. The cycle was the same as the one used in Example 5, FIG. 4.

c) Observation of the Joint

After cooling, the assembly was well joined. The joint was characterized under scanning electron microscope. No reactivity was evidenced on the scale of scanning electron microscopy. The joint was filled to 90%, and some small voids were observed.

EXAMPLE 7

This example describes the preparation of bonds, assemblies between two parts made of pure, sintered α-SiC silicon carbide, using the brazing method of the invention, brazing being conducted in capillary configuration using a brazing composition of the invention composed of 60% by mass Si and 40% by mass Nd.

This example also describes mechanical tests carried out on these assemblies.

a) Preparation of the Brazing Composition, of the Brazing Paste and of the Parts to be Assembled The targeted brazing composition, namely 60% by mass Si and 40% by mass Nd was prepared in the manner described in Example 2.

An organic binder (NICROBRAZ® cement) was added to the powder mixture to form a viscous braze paste.

The parts made of sintered SiC to be assembled were plates of size 20×10 mm$^2$ and of thickness 1.5 mm.

The parts were cleaned with acetone, then with ethanol and finally dried.

The substrates, parts were contacted leaving a slight offset of 1 to 2 mm, so as to leave a space for depositing the brazing paste in the vicinity of the joint (this configuration is called the capillary configuration). The paste was deposited with a spatula on the free surface at the edge of the joint, in the form of a bead of braze (see FIG. 1), as in Example 5. The amount of deposited paste was between 40 and 60 mg for this assembly.

b) Brazing

The contacted parts, ready to be brazed, were placed in a high vacuum brazing furnace and subjected to a vacuum brazing heat cycle comprising a single plateau for 20 minutes at 1330° C., which is the brazing plateau.

Figure 5:
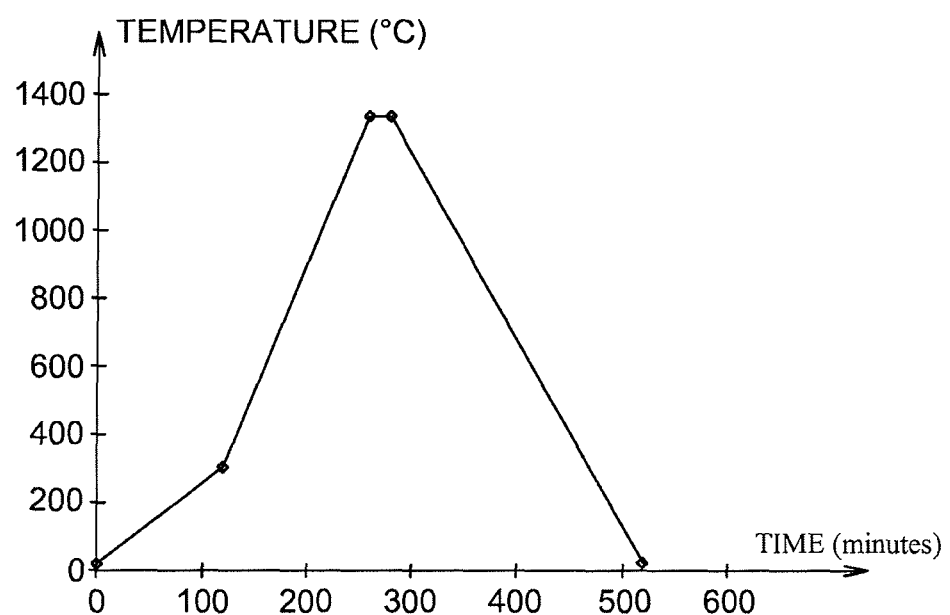
FIG. 5 is a graph showing the heating cycle for brazing used in Example 7. The time in minutes is given along the X-axis from the start of heat treatment, and the temperature T in ° C. is given along the Y-axis.

The heating cycle is illustrated in FIG. 5.

c) Observation of the Joint

After cooling, the assembly was well joined. The joint was characterized under scanning electron microscope. No <<void>> was observed and no reactivity was evidenced on the scale of observation under scanning electron microscopy.

d) Preparation of Mechanical Test Specimens and Results of Mechanical Testing

Test specimens (3 test specimens) for mechanical testing were prepared by brazing 2 parts (21, 22) of size 20×10×1.5 mm$^3$ with the brazing paste prepared at a) above and under the brazing conditions described at b) above. The mechanics of ceramics being statistical, more than one test specimen was prepared for the tests but the same method of production was used.

The test specimens are schematized in FIG. 2. They were held stationary on a mount and subjected to shear stress during a compression/shear test (23) at ambient temperature (preferred stress mode: shearing but this test does not allow pure shear to be obtained).

The test specimens were of identical size to those in Example 5 and were tested in similar manner.

Results of Mechanical Testing:

The determined breaking stresses for each of the 3 test specimens were: 87 MPa; 105 MPa; and 76 MPa; i.e. a mean value of 89 MPa.

Example 8

This example describes the preparation of bonds, assemblies between two parts made of pure, sintered α-SiC silicon carbide, using the brazing method of the invention, brazing being conducted in capillary configuration using a brazing composition of the invention composed of 80% by mass Si and 20% by mass Nd.

This example also describes mechanical tests performed on these assemblies.

a) Preparation of the Brazing Composition, of the Brazing Paste and of the Parts to be Assembled The targeted brazing composition, namely 80% by mass Si and 20% by mass Nd, was prepared in the manner described in Example 3.

An organic binder (NICROBRAZ® cement) was added to the powder mixture obtained to form a viscous braze paste.

The parts in sintered SiC to be assembled were plates of size 20×10 mm² and of thickness 1.5 mm.

The parts were cleaned with acetone, then with ethanol and finally dried.

The substrates, parts were placed in contact leaving a slight offset of 1 to 2 mm, so as to leave a space for depositing the brazing paste in the vicinity of the joint (this configuration is called a capillary configuration). The paste was deposited with a spatula on the free surface at the edge of the joint, in the form of a bead of braze (see FIG. 1), as in Example 5. The amount of deposited paste was between 40 and 60 mg for this assembly.

b) Brazing

The contacted parts, ready for brazing, were placed in a high vacuum brazing furnace and subjected to a vacuum brazing heat cycle comprising a single plateau for 20 minutes at 1440° C., which is the brazing plateau.

Figure 6:
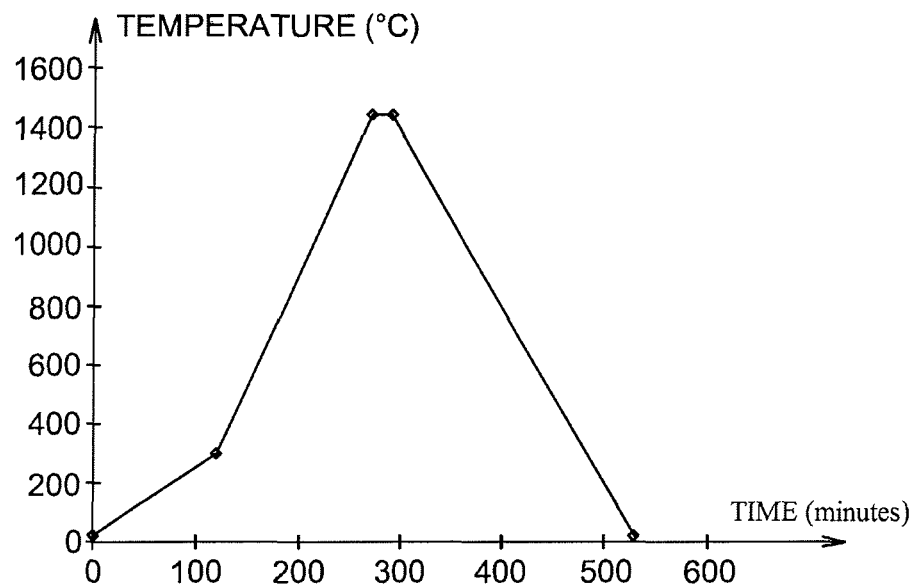
FIG. 6 is a graph showing the heating cycle for brazing used in Example 8. The time in minutes is given along the X-axis as from the start of heat treatment, and the temperature T in ° C. is given along the Y-axis.

The heating cycle is illustrated in FIG. 6.

c) Observation of the Joint

After cooling, the assembly was well joined. The joint was characterized under scanning electron microscope. There was no <<void>> and no reactivity was evidenced on the scale of observation under scanning electron microscopy.

d) Preparation of Test Specimens for Mechanical Testing and Results of Mechanical Tests Test specimens (3 specimens) for mechanical testing were prepared by brazing 2 parts (21, 22) of size 20×10×1.5 mm³ with the brazing paste prepared at a) above and under the brazing conditions described at b) above. Since the mechanics of ceramics are statistical, more than one specimen was prepared for testing but following the same production method.

The test specimens are schematized in FIG. 2. They were held stationary on a mount and subjected to shear stress during a compression/shear test (23) at ambient temperature (preferred stress mode: shearing but this test does not allow pure shear to be obtained).

The size of the test specimens was identical to those in Example 5 and they were subjected to similar testing.

Results of Mechanical Tests:

The breaking stresses determined for each of the 3 test specimens were: 62 MPa; 129 MPa; and 68 MPa; i.e. a mean value of 86 MPa.

EXAMPLE 9

This example describes the preparation of bonds, assemblies between two parts made of pure, sintered α-SiC silicon carbide, using the brazing method of the invention, brazing being conducted in capillary configuration using a brazing composition of the invention composed of 95% by mass Si and 5% by mass Nd.

This example also describes mechanical tests performed on these assemblies.

e) Preparation of the Brazing Composition, of the Brazing Paste, and of the Parts to be Assembled The targeted brazing composition, namely 95% by mass Si and 5% by mass Nd was prepared in the same manner as described for Example 4.

An organic binder (NICROBRAZ® cement) was added to the powder mixture obtained to form a viscous brazing paste.

The parts made of sintered SiC to be assembled were plates of size 20×10 mm² and of thickness 1.5 mm.

The parts were cleaned with acetone, then with ethanol, and finally dried.

The substrates, parts were placed in contact leaving a slight offset of 1 to 2 mm, so as to leave a space for depositing the brazing paste in the vicinity of the joint (this configuration is called a capillary configuration). The paste was deposited with a spatula on the free surface at the edge of the joint, in the form of a bead of paste (see FIG. 1), as in Example 5. The amount of deposited paste was between 40 and 60 mg for this assembly.

f) Brazing

The contacted parts, ready for brazing, were placed in a high vacuum brazing furnace and subjected to a vacuum brazing heat cycle, comprising a single plateau for 20 minutes at 1440° C., which is the brazing plateau.

The heating cycle is illustrated in FIG. 6 and was identical to the one used in Example 8.

g) Observation of the Joint

After cooling, the assembly was well joined. The joint was characterized under scanning electron microscope. There was no <<void>> and no reactivity was evidenced on the scale of observation under scanning electron microscope.

h) Preparation of the Test Specimens for Mechanical Testing and Results of Mechanical Tests Test specimens (3 specimens) for mechanical testing were prepared by brazing 2 parts (21, 22) of size 20×10×1.5 mm³ with the brazing paste prepared at a) above and under the brazing conditions described at b) above. Since the mechanics of ceramics are statistical, more than one test specimen was prepared for testing but following the same production method.

The test specimens are schematized in FIG. 2. They were held stationary on a mount and subjected to shear stress during a compression/shear test (23) at ambient temperature (preferred stress mode: shearing, but this test does not allow pure shear to be obtained).

The size of the test specimens was identical to those in Example 5 and they were tested in a similar manner.

Results of Mechanical Tests

The breaking stresses determined for each of the 3 test specimens were: 72 MPa; 68 MPa; and 53 MPa; i.e. a mean value of 64 MPa.

EXAMPLE 10

This example is a comparative example which describes the preparation of bonds, assemblies between two parts made of pure, sintered α-SiC silicon carbide, using a brazing method performed in capillary configuration and using a comparative brazing composition, not according to the invention, composed of 42% by mass Si and 58 mass % Nd.

This example also describes the mechanical tests performed on these assemblies.

a) Preparation of the Brazing Composition, of the Brazing Paste and of the Parts to be Assembled The targeted brazing composition, namely 42% by mass Si and 58% by mass Nd was prepared following as described in Example 2, evidently modifying the concentrations of Si and Nd.

An organic binder (NICROBRAZ® cement) was added to the powders mixture obtained to form a viscous brazing paste.

The parts made of sintered SiC to be assembled were plates of size 20×10 mm² and of thickness 1.5 mm.

The parts were cleaned with acetone, then with ethanol, and finally dried.

The substrates, parts were placed in contact leaving a slight offset of 1 to 2 mm, so as to leave a space for depositing the brazing paste in the vicinity of the joint (this configuration is called a capillary configuration). The paste was deposited with a spatula on the free surface at the edge of the joint, in the form of a bead of paste (see FIG. 1), as in Example 5. The amount of deposited paste was between 40 and 60 mg for this assembly.

b) Brazing

The contacted parts, ready for brazing, were placed in a high vacuum brazing furnace and subjected to a vacuum braze heating cycle comprising a single plateau for 20 minutes at 1460° C., which is the brazing plateau.

c) Observation of the Joint

After cooling, the assembly was well joined. The joint was characterized under scanning electron microscope. There was no <<void>> and no reactivity was evidenced under observation on the scale of scanning electron microscopy.

d) Preparation of Test Specimens for Mechanical Testing and Results of Mechanical Tests Test specimens (3 specimens) for mechanical testing were prepare'd by brazing 2 parts (21, 22) of size 20×10×1.5 mm$^3$ with the brazing paste prepared at a) above and under the brazing conditions described at b) above. Since the mechanics of ceramics are statistical, more than one test specimen was prepared for the tests but following the same production method.

The test specimens are schematized in FIG. 2. They were held stationary in a mount and subjected to shear stress during a compression/shear test (23) at ambient temperature (preferred stress mode: shearing, but this test does not allow pure shear to be obtained).

The test specimens were of identical size to those in Example 5 and were tested in similar manner.

Results of Mechanical Tests:

One of the breaking stresses determined was 30 MPa, which is distinctly lower than the mean tensile strength obtained in the examples according to the invention performed with brazing compositions of the invention i.e. 76 MPa, and it is also much below the lowest value of the breaking stresses obtained in the examples according to the invention, conducted with brazing compositions of the invention i.e. 53 MPa.

EXAMPLE 11

This example describes the preparation of bonds, assemblies between two parts made of pure, sintered α-SiC obtained using a comparative braze composition, not according to the invention, composed of 59% by mass Si and 41% by mass Y.

This example also describes the mechanical tests performed on these assemblies.

a) Preparation of the Brazing Composition, of the Brazing Paste and of the Parts to be Assembled.

The targeted brazing composition, namely 59% by mass Si and 41% by mass Y was prepared from Si powder and YSi$_2$ powder.

These powders were weighed paying heed to the proportions of the targeted brazing composition. They were then mixed in a <<Turbula>> for at least 30 minutes to obtain a homogeneous powders mixture.

An organic binder (NICROBRAZ® cement) was added to this powders mixture to form a viscous paste.

The parts made of sintered SiC to be assembled were plates of size 20×20 mm$^2$ and of thickness 1 mm.

The parts were cleaned with acetone, then with ethanol and finally dried.

The substrates, parts were placed in contact leaving an offset of 1 to 2 mm, to leave a space for depositing the brazing paste in the vicinity of the joint (this configuration is called a capillary configuration), as in Example 5. The paste was deposited with a spatula on the free surface at the edge of the joint in the form of a bead of braze (see FIG. 1). The quantity of deposited paste was between 50 and 100 mg for this assembly.

b) Brazing

The contacted parts, ready for brazing, were placed in a high vacuum brazing furnace and subjected to a brazing heat cycle under a high vacuum. The heating cycle comprised two plateaus:

a first plateau for 90 minutes at 1135° C.;

a second plateau which was the brazing plateau at 1270° C.

c) Observation of the Joint

After cooling, the assembly was well joined. The joint was characterized under scanning electron microscope. There was no <<void>> and no reactivity on the scale of scanning electron microscopy was evidenced under scanning electron microscopy.

d) Preparation of the Specimens for Mechanical Testing and Results of Mechanical Tests Test specimens (4 specimens) for mechanical testing were prepared by brazing 2 parts 21, 22 of size 20×10×1 mm$^3$ with the brazing paste prepared at a) above and under the brazing conditions described at b) above. Since the mechanics of ceramics are statistical, more than one test specimen was prepared for testing but following the same production method.

The test specimens are schematized in FIG. 2. They were held stationary in a mount and subjected to shear stress by compression/shear (23) as in Examples 5, 7, 8, 9 and 10 at ambient temperature.

Results of Mechanical Tests:

The breaking stress values determined for each of the 4 test specimens were: 27 MPa; 21 MPa; 21 MPa; 34 MPa; i.e. a mean value of 25 MPa.

The values of breaking stresses are distinctly lower than those of Examples 5, 7, 8 and 9 whose mean value is 76 MPa.

EXAMPLE 12

This example describes the preparation of bonds, assemblies between two parts made of pure, sintered α-SiC silicon carbide, following a brazing method in capillary configuration and using a comparative brazing composition not according to the invention i.e. a Si—Ce system composed of 57% by mass Si and 43% by mass Ce.

This example also describes mechanical tests performed on these assemblies.

a) Preparation of the Brazing Composition, of the Brazing Paste and of the Parts to be Assembled The targeted brazing composition, namely 57% by weight Si and 43% by weight Ce was prepared from Si powder and CeSi$_2$ powder.

These powders were weighed paying heed to the proportions of the targeted brazing composition. They were then mixed in a <<Turbula>> for at least 30 minutes to obtain a homogeneous powders mixture.

An organic binder (NICROBRAZ® cement) was added to this powders mixture to form a viscous paste.

The parts made of sintered SiC to be assembled were plates of size 20×20 mm² and of thickness 1 mm.

The parts were cleaned with acetone then with ethanol, and finally dried.

The substrates, parts were placed in contact leaving an offset of 1 to 2 mm so as to leave a space for depositing the brazing paste in the vicinity of the joint (this configuration is called a capillary configuration) as in Example 5. The paste was deposited with a spatula on the free surface at the edge of the joint in the form of a bead of braze (see FIG. 1). The deposited amount was between 50 and 100 mg for this assembly.

b) Brazing

The contacted parts, ready for brazing, were placed in a high vacuum brazing furnace and subjected to a brazing heat cycle under high vacuum. The heating cycle comprised a single plateau at 1280° C. for 20 minutes, which is the brazing plateau.

c) Observation of the Joint.

After cooling, the assembly was well joined. The joint was characterized under scanning electron microscope. There was no <<void>> and no reactivity on the scale of scanning electron microscopy was observed.

d) Preparation of the Test Specimens for Mechanical Testing and Results of Mechanical Tests Test specimens (2 specimens) for mechanical testing were prepared by brazing 2 parts (21, 22) of size 20×10×1.5 mm³ with the brazing paste prepared at a) above and under the brazing conditions described at b) above. Since the mechanics of ceramics are statistical, more than one test specimen was prepared for testing but following the same production method.

The test specimens are schematized in FIG. 2. They were held stationary on a mount and subjected to shearing by compression/shear (23) at ambient temperature following the same protocol as for Examples 5, 7, 8, 9, 10 and 11.

Results of the Mechanical Tests

The breaking stress values determined for each of the 2 test specimens were 10 MPa and 29 MPa; i.e. a mean value of 20 MPa.

The values of these breaking stresses are much lower than those in Examples 5, 7, 8 and 9 according to the invention, whose mean value is 76 MPa.

EXAMPLE 13

In this example, 3 plates made of pure, sintered α-SiC silicon carbide were assembled using two successive brazing operations at two different brazing temperatures with a Si—Nd brazing composition and a Si—Zr brazing composition respectively.

The Si—Zr brazing composition was prepared from a mixture of two powders of Si and $ZrSi_2$ in proportions chosen so as to pay heed to the targeted composition of 11.5% by mass Zr and 88.5% by mass Si.

This mixture was then homogenized in a <<Turbula>> for at least 30 minutes. An organic binder (Nicrobraz® cement or Vitta® gel) was added to this powder mixture to form the brazing paste. Three plates made of SiC (2 plates of size 40×40×1 mm³ and 1 plate of side 50×50×1 mm³) were cleaned with acetone then with ethanol, and finally dried.

Figure 7:
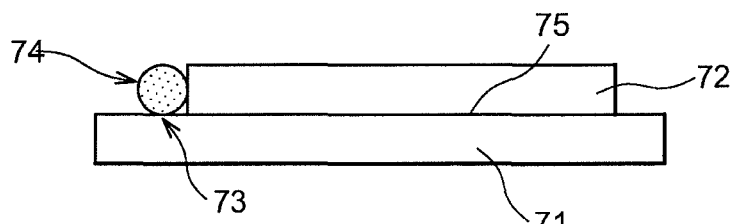
FIG. 7 is a schematic view showing the arrangement of the first and second plates in SiC-based material, and the Si—Zr braze paste composition, for brazing the first and second plates in Examples 7 and 8 in capillary configuration.

One plate (71) of size 50×50×1 mm³ was covered with a plate (72) of size 40×40×1 mm³. A space (73) was left free on the edge of the upper plate (72) to deposit the braze paste (74) in the vicinity of the joint (75). The paste was deposited with a spatula on the free surface at the edge of the joint, in the form of a bead of brazing composition (74), the amount of brazing composition deposited being 200 mg (FIG. 7).

The assembly was placed in a furnace and subjected to a brazing heat cycle under a high vacuum, with a brazing plateau for 20 minutes at 1420° C. After cooling, the assembly was well brazed.

Figure 8:
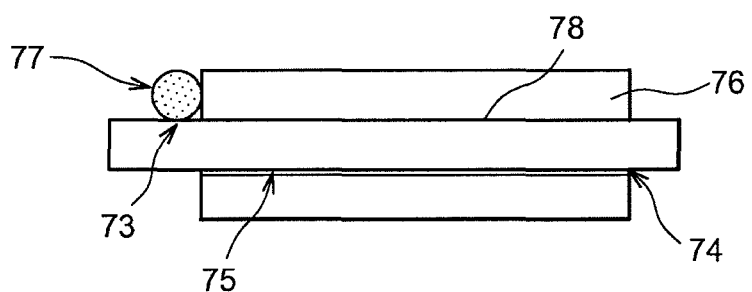
FIG. 8 is a schematic view showing the arrangement of the first and second plates in SiC-based material brazed with a Si—Zr braze composition, and of the Si—Nd braze paste composition used for brazing the first and second plates in capillary configuration with a third plate in Examples 7 and 8.

This assembly was then placed in contact with the third plate (76) made of pure, sintered α-SiC of size 40×40×1 mm³ as shown in FIG. 8. The Si—Nd brazing paste composed of 48.7% Si-51.3% Nd (mass %) was prepared from the pure Si and Nd elements as indicated in Example 1. The brazing paste (77) was deposited on the edge of the second joint (78) (FIG. 8), the amount of deposited brazing composition being 420 mg. The assembly was placed in a furnace and subjected to a brazing heat cycle under a high vacuum with a homogenization plateau for 2 hours at 1100° C. followed by a brazing plateau at 1250° C. for 30 minutes.

After this heating cycle, the three plates were well brazed. The Zr—Si brazing composition had not melted at the time of the second brazing cycle since this braze starts to melt on and after 1370° C., i.e. 120° C. above the temperature of the second brazing plateau. The joints thus formed were characterized by metallography and were well filled with the brazing compositions.

EXAMPLE 14

In this example, 3 plates made of pure, sintered α-SiC were assembled with two successive brazing operations at two different brazing temperatures using a Si—Nd brazing composition and a Si—Zr brazing composition respectively, the Si—Nd brazing composition having a different composition to the one in Example 13.

A first assembly of two plates was brazed with the Si—Zr braze of composition 11.5% by mass Zr and 88.5% by mass Si, as detailed in Example 13 with a brazing plateau for 20 minutes at 1420° C. (plates of same size as in Example 13) (FIG. 7).

This assembly was then placed in contact with the third plate made of pure, sintered α-SiC of size 40×40×1 mm³.

The Si—Nd brazing paste composed of 60% Si-40% Nd (mass %) was prepared from pure Si and Nd elements as indicated in Example 2. The brazing paste was deposited on the edge of the second joint (FIG. 8), the amount of deposited brazing paste being 400 mg. The assembly was placed in a furnace and subjected to a brazing heat cycle under a high vacuum, with a homogenization plateau for 2 hours at 1100° C. followed by a brazing plateau at 1330° C. for 30 minutes.

After this heating cycle, the three plates were well brazed. The Zr—Si brazing composition had not melted at the time of the second brazing cycle since this brazing composition starts to melt on and after 1370° C., i.e. 40° C. above the temperature of the second brazing plateau. The joints thus formed were characterized by metallography and were well filled with the brazing compositions.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

References

[1] Gasse A., Coing-Boyat G., Bourgeois G., "Method using a thick joint for joining parts in SiC-based materials by refractory brazing and refractory thick joint thus obtained", Brevet U.S. Pat. No. 5,975,407, 1999.
[2] Gasse A., "*Method for assembling parts made of materials based on SiC by non-reactive refractory brazing, brazing composition, and joint and assembly obtained by said method*", Application US-A1-2003/0038166.
[3] Heap H., "*Method for assembling parts made of materials based on SiC by non-reactive refractory brazing, brazing composition, and joint and assembly obtained by said method*", Patent US-A-2003/0038166, 1974.
[4] Montgomery F. C., Streckert H. H., Braze for Silicon Carbide bodies, Patent U.S. Pat. No. 5,447,683, 1995.

What is claimed is:

1. A method for assembling at least two parts made of silicon carbide-based materials by non-reactive brazing, the method comprising:
    placing the parts in contact with a non-reactive brazing composition;
    heating an assembly formed by the parts and the brazing composition to a brazing temperature sufficient to melt the brazing composition; and
    cooling the parts and the brazing composition so that, after solidification of the brazing composition, a moderately refractory joint is formed,
    wherein the non-reactive brazing composition is a binary alloy composed, in mass percentages, of about 46% to 99% silicon and 54% to 1% neodymium.
2. The method according to claim 1, wherein the brazing temperature is equal to or lower than 1450° C.
3. The method according to claim 1, wherein the brazing composition is a binary alloy, composed in mass percentages, of 48% to 51% silicon, and 52% to 49% neodymium.
4. The method according to claim 1, wherein the brazing composition is a binary alloy, composed in mass percentages, of 51% to 58% silicon, and 49% to 42% neodymium.
5. The method according to claim 1, wherein the brazing composition is a binary alloy, composed in mass percentages, of 58% to 65% silicon, and 42% to 35% neodymium.
6. The method according to claim 1, wherein the brazing composition is a binary alloy, composed in mass percentages, of 65% to 80% silicon, and 35% to 20% neodymium.
7. The method according to claim 1, wherein the brazing composition is a binary alloy, composed in mass percentages, of 80% to 95% silicon, and 20% to 5% neodymium.
8. The method according to claim 1, wherein the brazing composition is a binary alloy, composed in mass percentages, of 95% to 99% silicon, and 5% to 1% neodymium.
9. The method according to claim 1, further comprising: prior to the heating, adding a reinforcement to the brazing composition.
10. The method according to claim 9, wherein the reinforcement is made of a ceramic material, carbon or SiC.
11. The method according to claim 9, wherein the reinforcement is in the form of particles, fiber, non-woven made of fiber, or a fiber fabric.
12. The method according to claim 9, wherein the reinforcement is added in an amount of 5 to 49% by mass relative to the weight of the brazing composition.
13. The method according to claim 1, wherein the brazing composition is formed in powder, wherein the brazing composition powder is placed in suspension in an organic binder so as to obtain a suspension or paste, and wherein at least one surface of the parts to be assembled is coated with the suspension or paste obtained.
14. The method according to claim 13, wherein a surface to be assembled of at least one of the parts to be assembled is coated with the suspension or paste, then the surfaces of the parts to be assembled are contacted so that the suspension or paste is inserted there between.
15. The method according to claim 13, wherein the parts to be assembled are placed in contact observing an offset between them so as to create a free surface able to receive the suspension or paste close to the joint formed by the surfaces to be assembled of the parts to be assembled, and the suspension or paste is deposited on the free surface.
16. The method according to claim 1, wherein the heating is conducted at a brazing temperature that is least 15° C. higher than the melting point of the brazing composition.
17. The method according to claim 16, wherein the heating is performed by conducting a brazing plateau at a brazing temperature of 1210° C. to 1450° C., held for a time of 15 to 90 minutes.
18. The method according to claim 17, wherein the brazing plateau is conducted at a brazing temperature of 1250° C. and is held for a time of 30 minutes.
19. The method according to claim 17, wherein, prior to the brazing plateau, a first plateau is observed at a temperature of 1080° C. to 1150° C. held for a time of 30 to 120 minutes.
20. The method according to claim 1, wherein the silicon carbide-based materials are chosen from among pure silicon carbides and composite SiC-based materials.
21. The method according to claim 1, wherein the silicon carbide-based materials are chosen from one or more of the following:
    pressureless sintered silicon carbide, Si-infiltrated silicon carbide, porous, recrystallized silicon carbide, silicon graphite ("C—SiC") composed of graphite coated with a layer of SiC, SiC/SiC composites, SiC/SiC composites with self-healing matrix, C/SiC composites, SiC monocrystals, and SiC composites with another ceramic.
22. The method according to claim 1, wherein the silicon carbide-based materials have a silicon carbide content of at least 50% by mass.
23. A method for assembling by brazing at least three parts made of silicon carbide-based materials, the method comprising:
    a) at a brazing temperature T1, assembling at least two parts made of silicon carbide-based materials using a brazing composition composed of a binary alloy of silicon and of an element X, the alloy being more refractory than the binary alloy composed, in mass percentages, of 46% to 99% silicon and 54% to 1% neodymium, whereby a first assembly of the at least two parts is obtained;
    b) assembling at least one other part made of a silicon carbide-based material with the first assembly according to the method for assembling at least two parts of claim 1, by brazing at a temperature T2.

24. The method according to claim 23, wherein T1 is higher than T2 by at least 40° C.

25. The method according to claim 23, wherein X is chosen from among Ti, Zr, V, Ru, Re, Hf, Cr and Rh.

26. The method according to claim 23, wherein the binary alloy of silicon and of an element X has a melting point higher than 1350° C., and the temperature T1 is 1400 to 1450° C.

27. An assembly comprising at least two parts made of SiC-based materials as produced by the method according to claim 1.

28. An assembly comprising at least three parts made of SiC-based materials produced by the method according to claim 23.

* * * * *

UNITED STATES PATENT AND TRADEMARK OFFICE
CERTIFICATE OF CORRECTION

PATENT NO. : 8,763,883 B2  
APPLICATION NO. : 13/394925  
DATED : July 1, 2014  
INVENTOR(S) : Valerie Chaumat et al.

Page 1 of 1

It is certified that error appears in the above-identified patent and that said Letters Patent is hereby corrected as shown below:

On the Title Page
 In column 2 (page 2, item 56) at lines 5-6, Under Other Publications, change "Matirials internation Societly," to --Materials international Society,--.

In the Specification
 In column 2 at line 19, Change "stappling" to --stapling--.
 In column 9 at line 30, Change "is'reached" to --is reached--.
 In column 9 at line 38, Change "No °1" to --No. 1--.
 In column 10 at line 11, Change "No °10" to --No. 10--.
 In column 18 at line 17, Change "more" to --more.--.
 In column 20 at lines 1-2, Delete "After cooling, an ingot.....obtain a powder." and insert the same on Col. 19, Line 67, after "hour." as the continuation of same Paragraph.
 In column 20 at line 59, Change "<21 sessile" to --<<sessile--.
 In column 23 at line 60, Change "90%," to --90%--.
 In column 27 at line 25, Change "prepare'd" to --prepared--.

In the Claims
 In column 32 at line 25, In Claim 16, before "least" insert --at--.
 In column 32 at line 38, In Claim 20, after "from" delete "among".

Signed and Sealed this  
Tenth Day of March, 2015

Michelle K. Lee  
*Deputy Director of the United States Patent and Trademark Office*